United States Patent
Masson

(10) Patent No.: US 9,511,877 B2
(45) Date of Patent: Dec. 6, 2016

(54) ELECTRONIC KIT BAG

(71) Applicant: Angela Masson, St. Augustine, FL (US)

(72) Inventor: Angela Masson, St. Augustine, FL (US)

( * ) Notice: Subject to any disclaimer, the term of this patent is extended or adjusted under 35 U.S.C. 154(b) by 0 days.

(21) Appl. No.: 14/143,592

(22) Filed: Dec. 30, 2013

(65) Prior Publication Data

US 2014/0188311 A1 Jul. 3, 2014

Related U.S. Application Data

(63) Continuation-in-part of application No. 13/113,197, filed on May 23, 2011, now Pat. No. 8,645,006, which is a continuation of application No. 11/501,516, filed on Aug. 9, 2006, now Pat. No. 7,970,531.

(51) Int. Cl.
| | |
|---|---|
| *A41D 1/00* | (2006.01) |
| *D03D 1/00* | (2006.01) |
| *G05D 1/00* | (2006.01) |
| *G05D 1/02* | (2006.01) |
| *G08G 5/00* | (2006.01) |
| *B64D 43/00* | (2006.01) |
| *B64D 10/00* | (2006.01) |
| *G01C 23/00* | (2006.01) |
| *G02B 27/01* | (2006.01) |
| *B64D 45/00* | (2006.01) |

(52) U.S. Cl.
CPC .............. *B64D 43/00* (2013.01); *A41D 1/002* (2013.01); *B64D 10/00* (2013.01); *D03D 1/0088* (2013.01); *B64D 2045/0075* (2013.01); *G01C 23/00* (2013.01); *G02B 27/017* (2013.01); *G05D 1/00* (2013.01); *G05D 1/0202* (2013.01); *G08G 5/003* (2013.01); *G08G 5/0039* (2013.01); *Y02T 50/53* (2013.01)

(58) Field of Classification Search
CPC ........ A41D 1/002; D03D 1/0088; G05D 1/00; G05D 1/0202; G08G 5/003; G08G 5/0039
See application file for complete search history.

(56) References Cited

U.S. PATENT DOCUMENTS

| | | | | |
|---|---|---|---|---|
| 3,979,057 | A | * | 9/1976 | Katz et al. ................. 708/130 |
| 4,086,632 | A | | 4/1978 | Lions |
| 4,413,316 | A | * | 11/1983 | Blue et al. ..................... 701/3 |
| 4,642,775 | A | * | 2/1987 | Cline et al. ................ 701/528 |
| 4,774,670 | A | * | 9/1988 | Palmieri ......................... 701/3 |
| 5,041,982 | A | | 8/1991 | Rathnam |
| 5,220,507 | A | | 6/1993 | Kirson |
| 5,844,503 | A | * | 12/1998 | Riley et al. ................. 340/945 |
| 5,883,586 | A | | 3/1999 | Tran et al. |
| 5,999,882 | A | * | 12/1999 | Simpson et al. ............... 702/3 |
| 6,259,988 | B1 | | 7/2001 | Galkowski et al. |

(Continued)

*Primary Examiner* — Fadey Jabr
*Assistant Examiner* — Thomas Ingram
(74) *Attorney, Agent, or Firm* — Maier & Maier, PLLC

(57) ABSTRACT

The Electronic Kit Bag (EKB) is a computerized, portable pilot "kit bag" that accepts input data, manipulates said data, and outputs solutions. The EKB consists of standard and state-of-the-art computing parts and peripherals, interfaced for maximum utility. The central operating program of the device assesses the relationships of input data through a logic based, three-dimensional decision-making algorithm. Data output is utilized either directly by the user, by the user through an aircraft system, or directly from the EKB to an aircraft system or autopilot.

30 Claims, 14 Drawing Sheets

(56) References Cited

U.S. PATENT DOCUMENTS

| | | |
|---|---|---|
| 6,278,283 B1 | 8/2001 | Tsugau |
| 6,341,504 B1* | 1/2002 | Istook .......................... 66/172 E |
| 6,424,355 B2* | 7/2002 | Watanabe et al. ............. 345/668 |
| 8,340,740 B2* | 12/2012 | Holzer et al. ................. 600/388 |
| 8,818,478 B2* | 8/2014 | Scheffler et al. .............. 600/388 |
| 8,966,942 B2* | 3/2015 | Dias et al. ...................... 66/170 |
| 2005/0090972 A1* | 4/2005 | Bodin et al. ................... 701/206 |
| 2007/0089800 A1* | 4/2007 | Sharma .......................... 139/388 |
| 2015/0150095 A1* | 5/2015 | Mere et al. ....................... 726/4 |

\* cited by examiner

ELECTRONIC KIT BAG

RELATED APPLICATIONS

This application is a continuation-in-part of U.S. patent application Ser. No. 13/113,197, filed May 23, 2011, which is a continuation of U.S. patent application Ser. No. 11/501,516, filed Aug. 9, 2006, which is now U.S. Pat. No. 7,970,531 the contents of which are incorporated herein, in their entireties, by reference thereto.

FIELD

This invention relates in general to computers, and, in particular, to the processing and translating of transportation data and functions through linear and non-linear methodologies into active operating parameters.

BACKGROUND

The historical development of this invention, the EKB, can be examined from three general perspectives: (1) weight; (2) utility; and (3) function.

1. Kit Bag Weight

Pilots, and other transportation professionals, routinely carry extremely heavy bags, full of paraphernalia specific to their art, including maps, calculators, logs, charts, navigation instruments, and so on. This bag is usually referred to as a "kit bag" and generally, for an aviation professional, for example, weights between 30 and 80 pounds. According to FAA Medical and Workman's Compensation statistics, the most common loss of work time, on the job injuries, in this work group are related to moving, carry and stowing the "kit bag": torn shoulder ligaments, dislocated elbows, "slipped disk" back problems, and knee joint problems.

The problem of the heavy kit bag/injured pilot has been attempted to be solved by at least one other means, adding wheels and a handle to the kit bag, roller-suitcase style.

The following invention was originally conceived with the intention of simply solving the weight problem, as the entire contents of a traditional kit bag can be reduced to a very light electronic equivalent. However, in developing the project, other innovative and highly functional properties became apparent.

2. Utility

The current kit bag can be compared to a cumbersome sideways drawer. An area is generally left in the cockpit, to the right or left of the pilot, where the kit bag can be placed. In flight, if an item is needed from the kit bag, there often ensues an unpacking, rummaging and hunting expedition into the kit bag for the sought after manual, tool, chart, log or other desired item. The pilot is taken out of the flying-loop while this hunting expedition is in progress. Another drawback of the old-fashioned kit bag is the traditional coffee-spill. Coffee-cup holders in the cockpit are generally placed right above the kit back stowage compartment. A kit bag is not considered "broken in" until at least one cup of coffee, orange juice or other non-paper friendly liquid has spilled into the contents of the kit bag and ruined the most important documents needed for the flight in progress, as well as any other important paperwork contained therein.

Further, the traditional kit bag must be hauled around like an additional suitcase. It is here that most on-the-job injuries occur: removing the kitbag from too tight of a storage area, heaving it into overhead bins, lifting it in and out of vans and storage facilities.

The utility problem has heretofore not been successfully addressed. Although, traditionally kit bags are made in various shapes and from various sorts of materials (including tin, plastic-covered card-board, canvas, etc.), they all only serve to hold contents in a standard method with the result being bulky, cumbersome and heavy.

The EKB approaches the problem from another perspective. By changing the contents of the kit bag, the nature of the exterior of the "bag" is also modified. The E6-B slide rule is a device, for instance, which can eliminate some wind charts and solve some airspeed/ground speed calculations. The handheld calculator, designed for the same function, was an electronic advancement, as is the Performance Management System, an integrated on-board aircraft system. Although these devices may individually partially contribute to certain aspects of a kit bag's contents and function (See Section 3 below), none address the concept of deleting the load or form of the kit bag in any way, let alone the entirety of all functional aspects of a kit bag. The EKB is light weight and easily manipulated. It can be moved without undue stress, strain or physical contortion. In use, it will not be below the coffee holders! Less physical storage place is needed, resulting in more cockpit room. Also, less weight is carried on-board, resulting in substantial and measurable fuel savings.

3. Function

As mentioned, with the traditional kit bag, the pilot must rummage through the contents in search of the needed material(s), taking the pilot out the immediate operating loop, and costing precious time, especially in an emergency. Often needed particulars are located in separate and disparate areas. The pilot may need to consult one manual for operating parameters, another book of charts for an off-line emergency airport, another manual for the emergency procedure, while simultaneously talking with dispatch or operations on a radio. The other pilot (in generally two-person airline crew) is left alone to fly a possibly crippled airplane, talk to the flight attendants and passengers, and negotiate with air-traffic control.

Few attempts have been made to alleviate the duress caused by this plethora of unrelated information presented in physically unrelated forms. One limited suggestion known to this inventor was an on-board type computer which used an aircraft up-link device to manage charts. This failed FAA certification, however, partly because it relied on aircraft power. The EKB, while providing much more information as well as information processing, relies on internal battery power (although it can be "charged" from aircraft power as well). The FAA has provided, incidentally, provisional operating permission for use of the EKB on-board.

The EKB requires learning only simple key-stroke patterns to be a superior replacement for the traditional kit bag and contents in many operating situations. Optimal functionality is acquired when all mentioned inputs are interfaced and electronically "evaluated." Several steps can be incorporated in one or a few input strokes from a proficient operator.

Additionally, the EKB has the potential capability to actually "fly" the aircraft within certain parameters to a touch-down and landing.

A major improvement over the traditional "kit bag" is that the computerized version can manipulate data in a non-linear algorithm, aggregating and sorting choices, thereby aiding in decision-making processes resulting in solutions to mathematical computations, runway selection, operating parameters, figuring pilot fatigue limits and scheduling issues.

In addition, output solutions can be interfaced with the craft, auto-pilot style, so that a craft could be manipulated through the EKB via radio/satellite/other mode transmissions by a ground operator in certain emergencies, such as crew incapacitation. There have been, over the years, various reports of pilots becoming unconscious due to hypoxia, or loss of consciousness due to altitude and lack of oxygen, while the aircraft, still connected to the autopilot, flies stalwartly ahead until simply running out of fuel and plunging earthbound with occupants, although unconscious, still presumably alive. This calamity is further magnified by where the aircraft might randomly crash, endangering and destroying more lives and property.

OBJECTIVES

It is the principal object of the current invention to create a device which, through the amalgamation and formalization of disparate operating data into a functional methodology that can then translated quickly and easily into today's operating environment, will not only make a pilot's overburdened job easier, but save lives.

RELATED ART

In order to provide background information so that the invention may be completely understood and appreciated in its proper context, reference is made to a number of prior art patents and publications as follows:
- computers
- calculating devices
- radios
- printers
- autopilots
- radio-controlled aircraft/missiles Whatever the precise merits, features and advantages of the above cited references, none of them achieve or fulfills the purposes of the present invention.

SUMMARY

Other than through exterior suit-case like changes, organizing the contents of the standard pilot kit bag into a more manageable, user friendly format has not been attempted. Coalescing and analyzing kit bag data electronically is a modern and sensible solution to the both the problems of physical ungainliness and practical application of the standard kit bag. Additionally, the problem of aircraft control during pilot incapacitation has also been inadequately addressed by any means other than self-help (oxygen use) or on-board autopilot capabilities. Heretofore there has been no device which offers a simultaneous, practical and coherent solution for either problem. The electronic, computerized portable kit bag (EKB), offers solutions to both problems in a single package.

The present invention is a portable, computerized, electronic kit bag (EKB) consisting of standard and state-of-the-art computer parts and peripherals, interfaced for maximum utility. The EKB has a central operating program which assesses the relationships of input data through a three-dimensional logic based decision-making algorithm and has output formatted to be utilized either directly by the end user, an intermediate user, by a user through an aircraft system, or directly from the device to an aircraft system or autopilot. The EKB can be used to maneuver, manipulate, and control an aircraft. The EKB can be used in this manner either onboard the aircraft, from a remote location, or automatically in conjunction with a program or set of programs. Additionally, EKBs can be linked, relaying information, onboard and remotely. Maneuvering may be managed either by an operator located at a remote location, by the pilot onboard the aircraft, or by a pre-installed program extant on the EKB in use.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention.

The EKB requires learning only simple key-stroke patterns to be a superior replacement for the traditional kit bag and contents in many operating situations. Other embodiments require only body motion detection, eye movement or bio-electrical input. Optimal functionality is acquired when all mentioned inputs are interfaced and electronically "evaluated." Several steps can be incorporated in one or a few input activities from a proficient operator. Additionally, the EKB has the potential capability to actually "fly" the aircraft within certain parameters to a touch-down and landing.

A major improvement over the traditional "kit bag" is that the computerized version can manipulate data in a non-linear algorithm, aggregating and sorting choices, thereby aiding in decision-making processes resulting in solutions to mathematical computations, runway selection, operating parameters, figuring pilot fatigue limits and scheduling issues. Output solutions can be interfaced with the craft, auto-pilot style, so that a craft could be manipulated through the EKB via radio/satellite/other mode transmissions by a ground operator in certain emergencies, such as crew incapacitation.

The portable, computerized electronic kit bag (EKB) consists of standard and state-of-the-art computer parts and peripherals, interfaced for maximum utility. The EKB can be constructed similarly for several end user/operators, including captains, pilots, commanders, drivers, dispatchers and operations personnel of boats/ships, automobiles, aircraft, spacecraft and other transportation devices. The example used here will apply to the pilot of an airliner.

Figure 1:
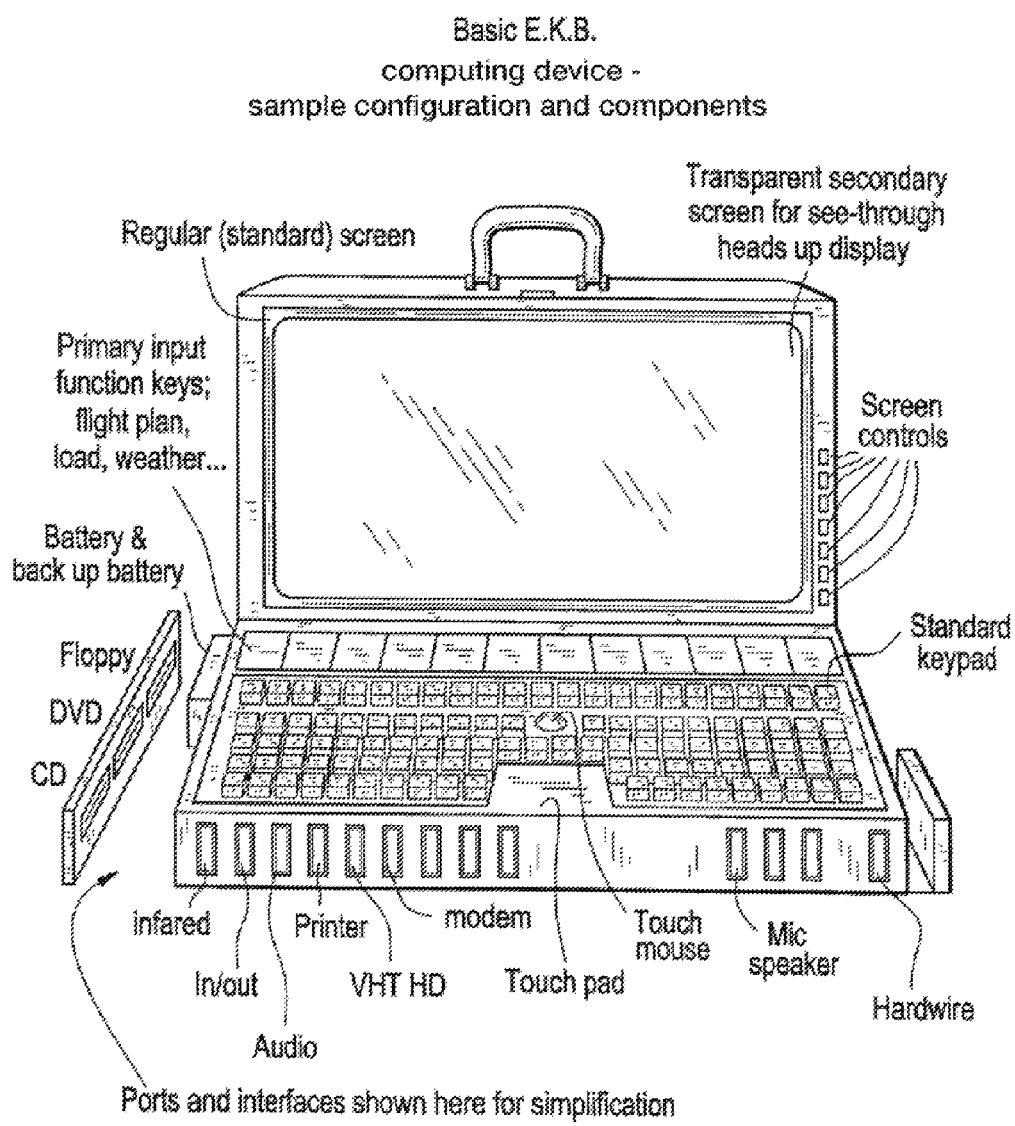
FIG. 1 is a front exterior view of an exemplary laptop-style EKB.
Figure 2:
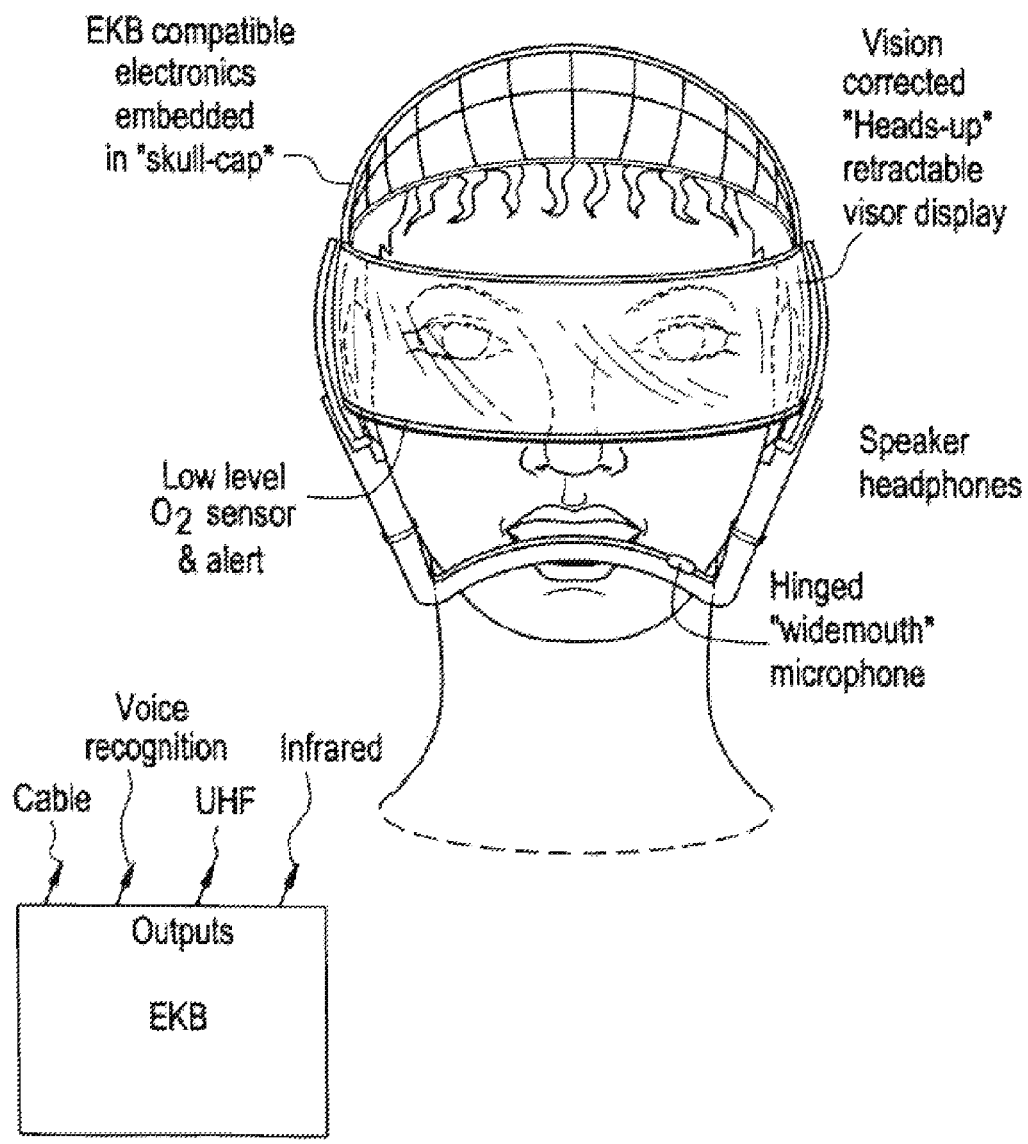
FIG. 2 is a front exterior view of an exemplary "all-in-one" interactive headgear EKB interface.
Figure 3:
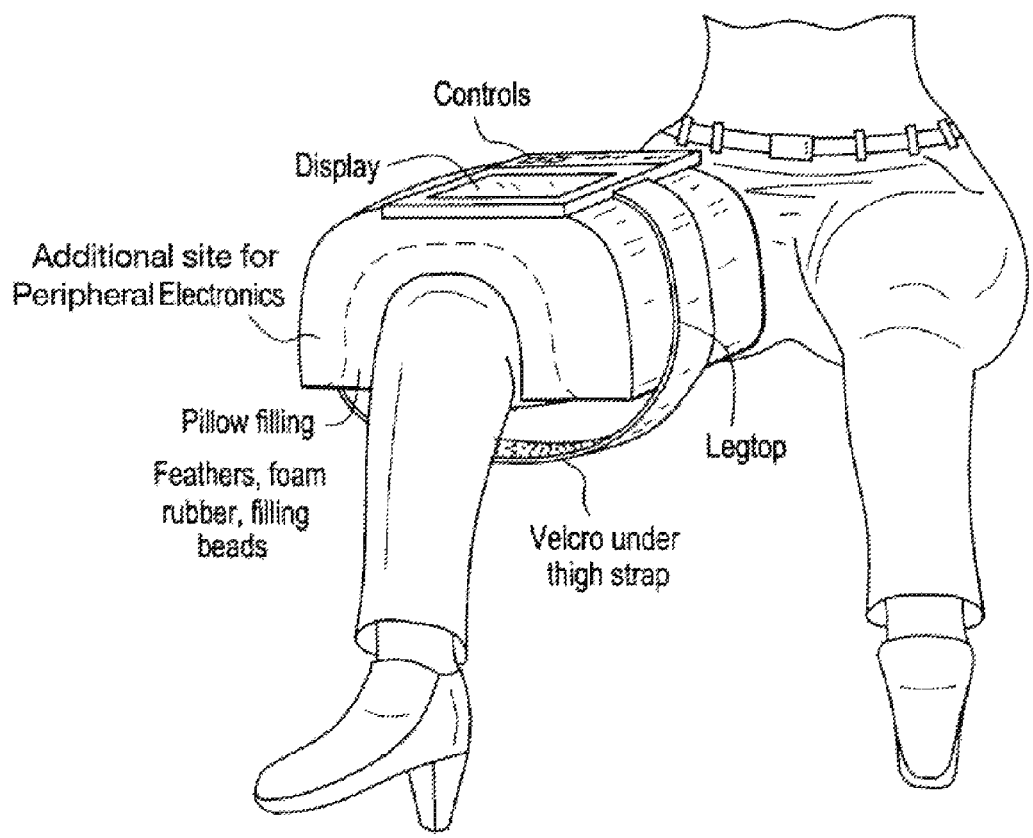
FIG. 3 is an exterior view of an exemplary ergonomically-designed EKB attached to the leg of a user.
Figure 11:
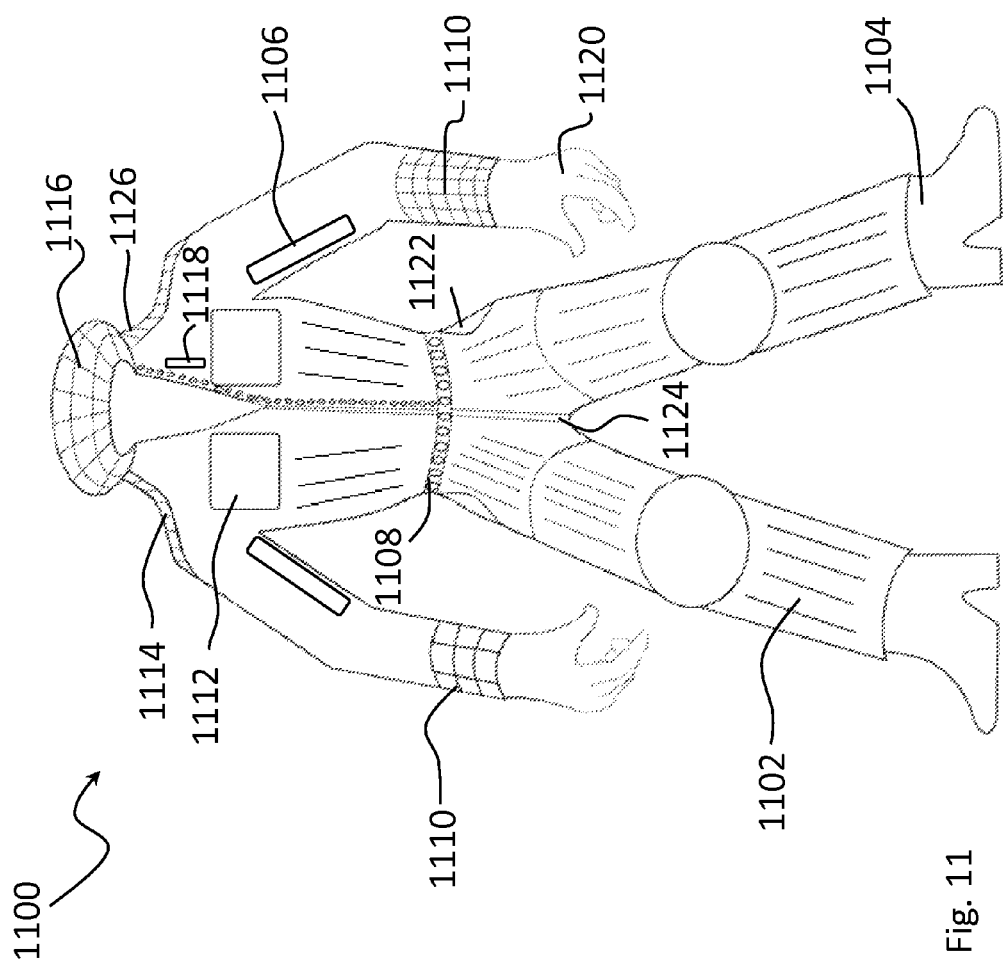
FIG. 11 is a front elevation view of an exemplary embodiment of EKB integrated apparel.
Figure 11A:
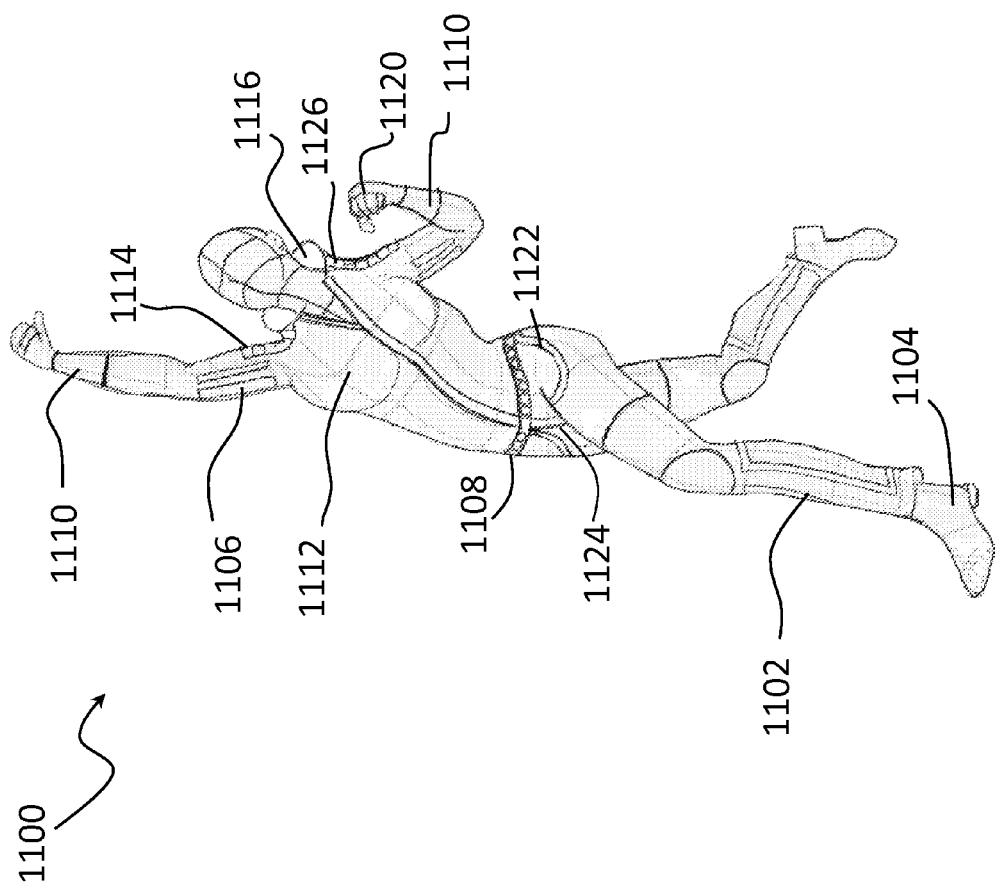
Figure 12:
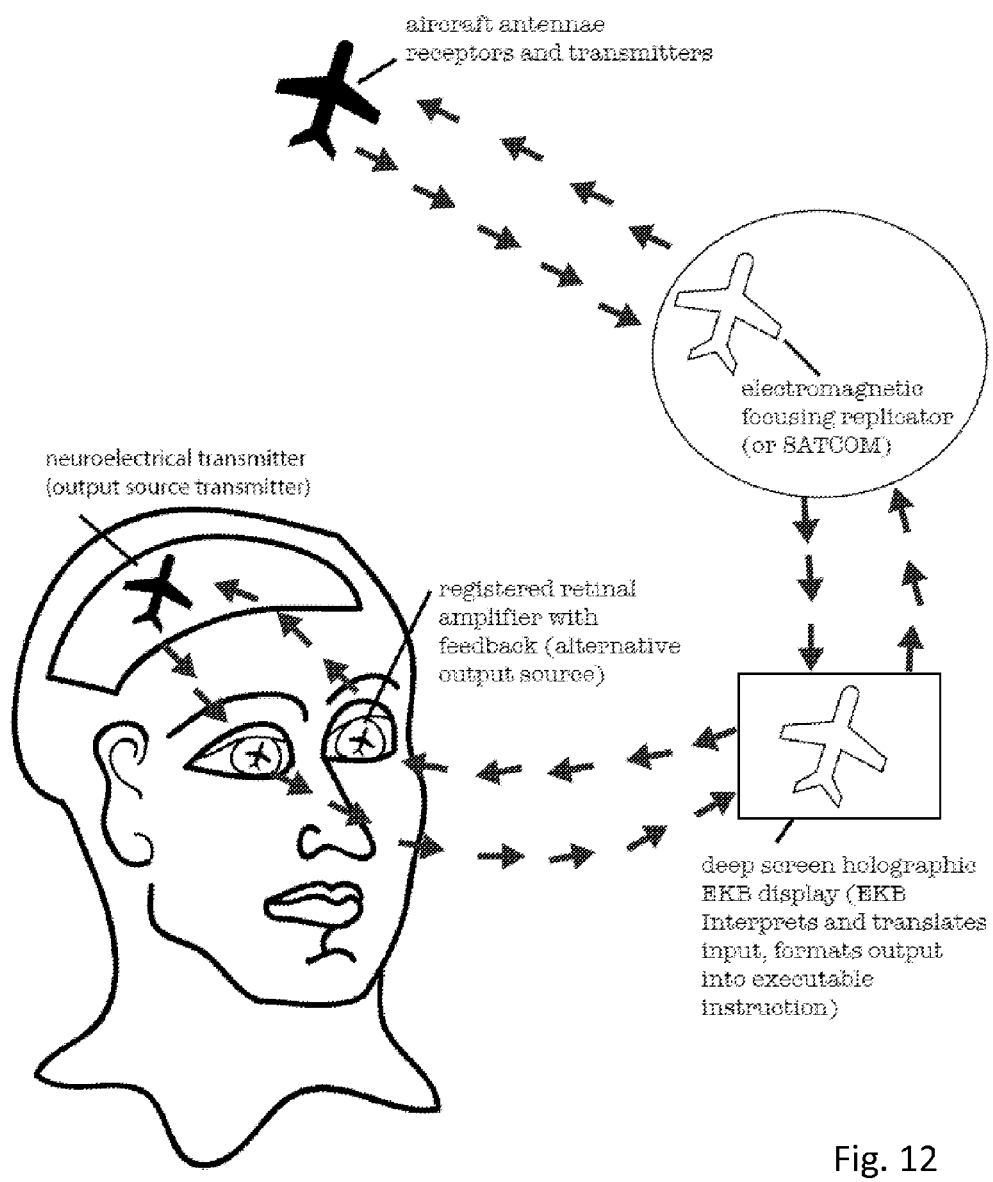
FIG. 12 is an exemplary embodiment of a biologically integrated EKB system.

The computer itself is a laptop type, or ergonomic variation thereof, such as a knee-top style (FIG. 3), handheld, wearable manifestation (FIG. 11), or biologically implanted device such as a neuro-electrical transmitter (FIG. 12). Enhancements include a translucent secondary window designed for the purpose of overlaying "heads-up" display information directly over maps, charts or other data displayed by a primary computer screen (FIG. 1). Peripherals include printers, zip-drives, and other standard or non-standard computer devices. The all-in-one interactive headgear which interfaces with an EKB (FIG. 2), is a sample non-standard peripheral.

Input is acquired online or off-line through modem, cable, direct input, CD, DVD, floppy disk, voice recognition, biofluorescence, infra red, radio (UHF, VHF), computer linking, video, digitally, scanning or any accessible and/or compatible means, internet and intranet systems included. Input provisions can also include a manual keyboard, touchpad, touch-screen, soft-key, cursor control device, touch recognition, movement recognition, voice recognition, sound recognition, retinal recognition, microphone equipment, telephone and DSL ports, disk drives, flash drives, USB, hotwire, firewire, infrared, ACARS, VHR, HF, AIRINC, Ethernet LAN, GPS, satellite transceiver ports, scanning, faxing, wireless data acquisition and control systems, or any other desired input functionality, including provisions for superseding and upgrading input methodologies, for example cables, pins, cords, wireless cards, connection devices, and USBs. The EKB can also accept input from any desired data source, for example the physical parts of software programs and data holding devices, or remotely accessed sources. Remotely accessed origins and recipients can include biological sources such as a human brain or cutaneous structure via neuro-electrical transmitters or retinal amplifiers, for example. Brain-computer interface has been demonstrated as an alternative communication channel in robotics where an electroencephalograph and computational methods identify mental activities. The mental activities are classified to improve the rate of successful commands to a robot or computer. Brain wave (EEG) readings can be picked up non-invasively through the electrodes on an EEG cap (see FIG. 2), or by a chip implanted into the brain's motor cortex (FIG. 12). The electrodes or chips pick up and report signals (or lack of signals) to an EKB which translates the pattern into electronic commands that can be disseminated via Wi-Fi, for example.

Similarly, retinal amplifiers have been successfully used in retina based mouse control. Various Human-Computer-Interface (HCI) systems have been developed for eye-tracking. Generally these digitize and translate eye movements into computer usable commands. One specific example uses an amplifier system to regard upward eye movement as a higher value and downward eye movement as a lower value. Stabilizing movements are considered when the retina is at rest. Strong blinks can result in strong responses. Filters are applied to the amplification to negate line noise and interference. Use of a "retina security scanner" or "registered retina" database would mitigate misuse of retinal amplification when using it to input commands to an EKB.

The nature of input data and sources can be typical and/or operationally unusual. This "parent" system is linked with other extant operating systems and data bases, such as reservations, meteorological, dispatch (routing, diversion and alternate planning), load planning, scheduling, airplane operating parameters, aircraft instruments and related systems (engine, hydraulic, GPS, inertial, radar, GPWS, collision avoidance, etc.), FAA crew rest and duty limits, union regulations and rules, charts/maps, log-books, airport analyses and any and all other links and data that may be made available to computer acquisition.

Processors can include multifarious programmable logic devices such as multi-core multi-processors or updated variations thereof.

Figure 4:
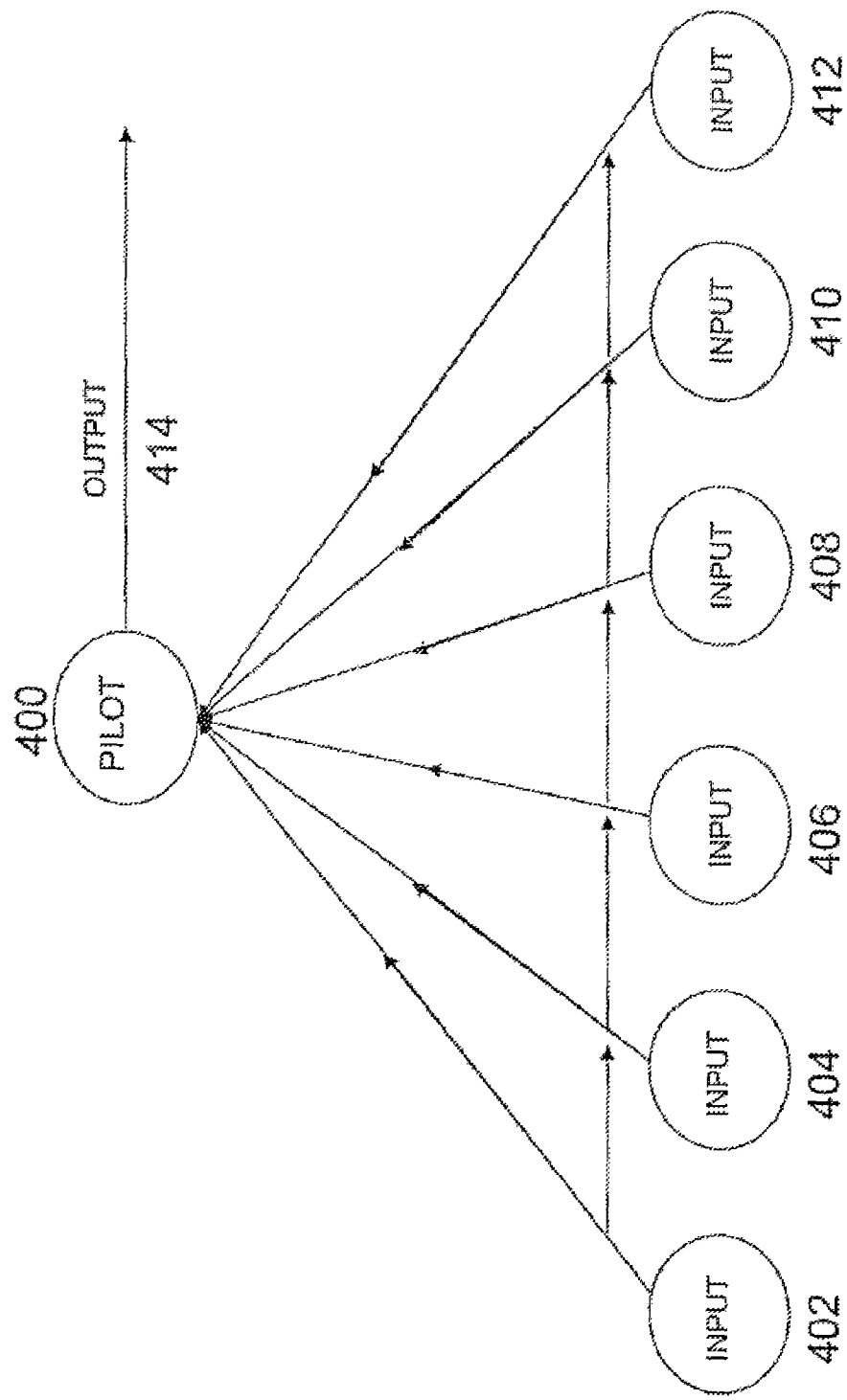
FIG. 4 is an exemplary diagram showing an exemplary prior art decision-making process.
Figure 5:
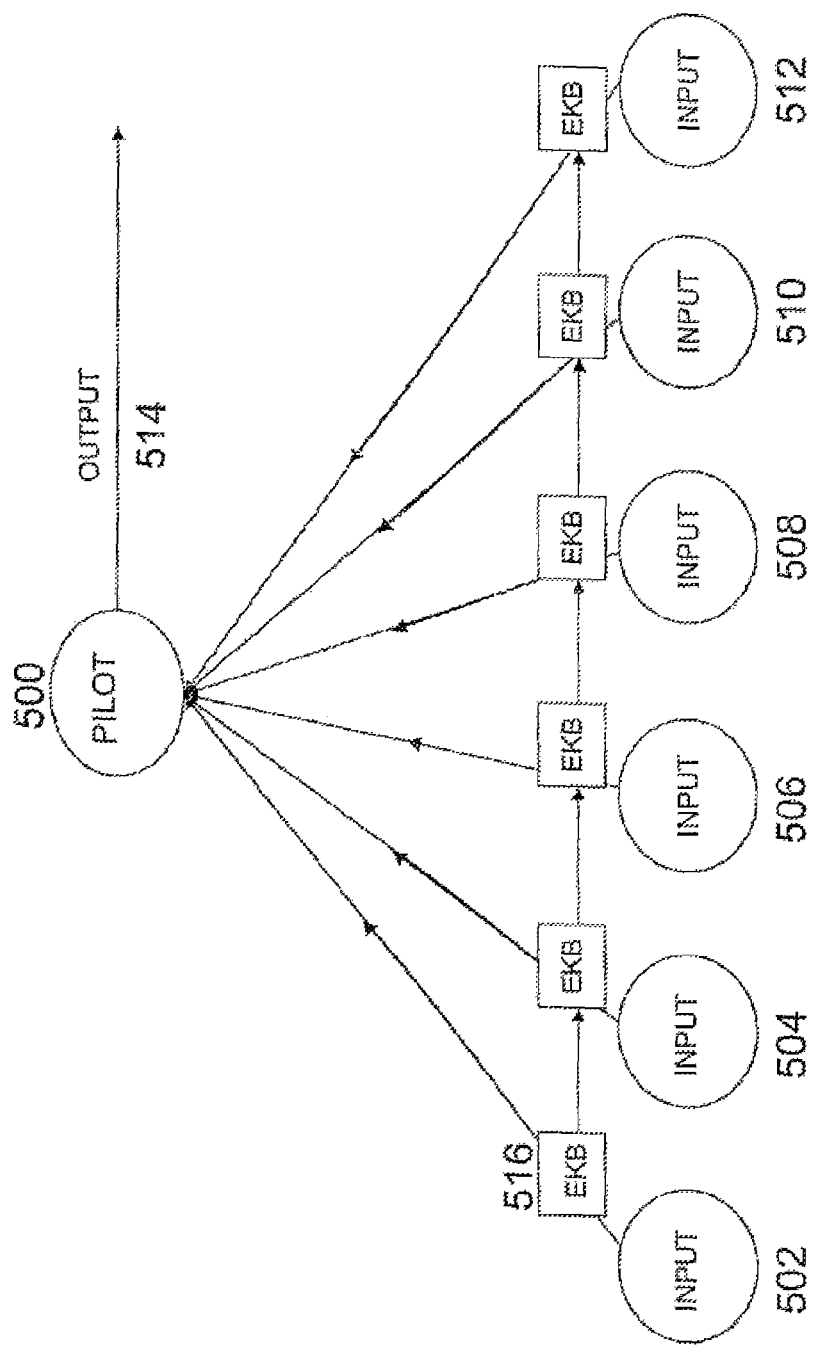
FIG. 5 is an exemplary diagram showing a matrix decision-making process for use by a transportation professional according to an exemplary embodiment.
Figure 6:
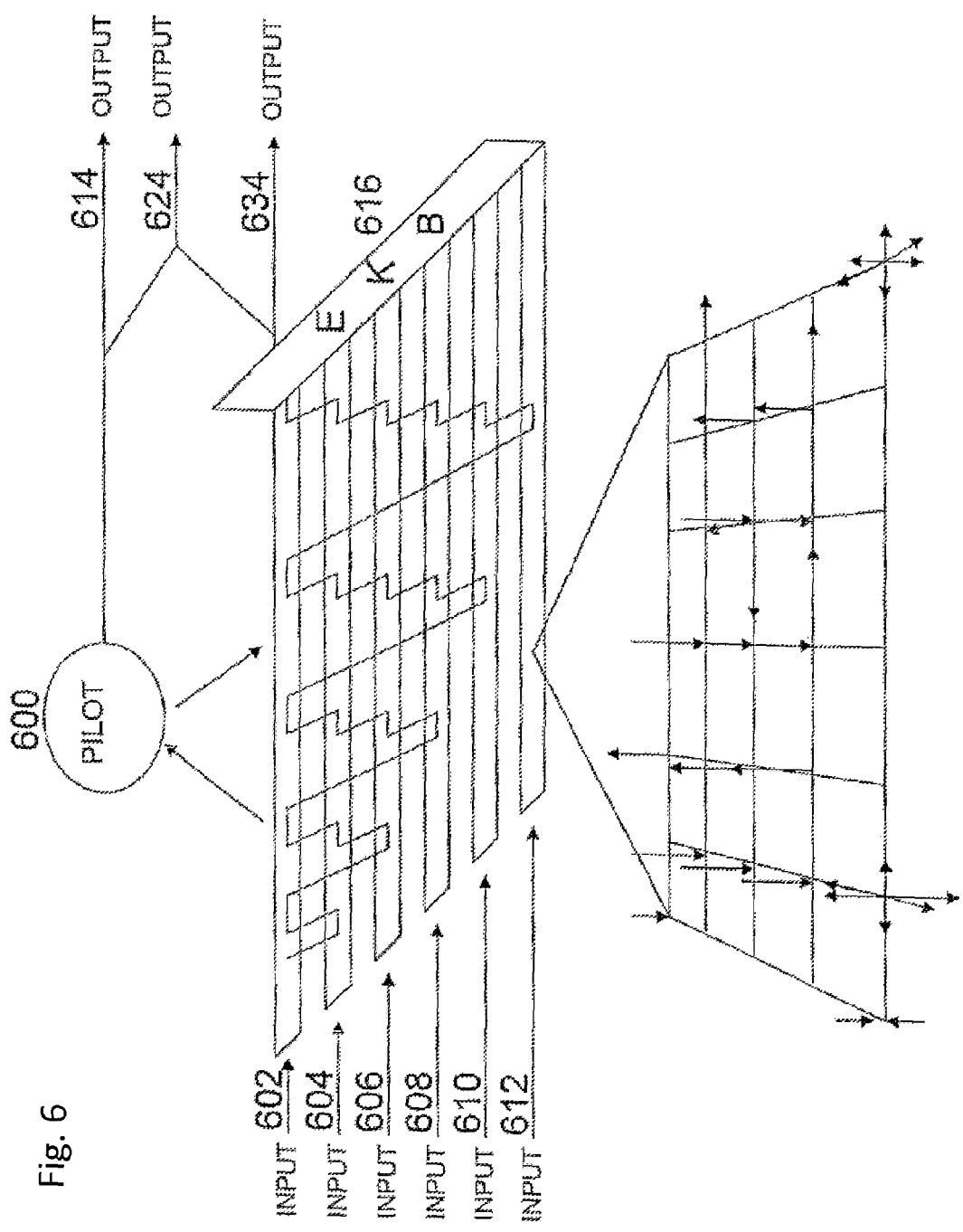
FIG. 6 is an exemplary diagram showing a three-dimensional decision-making process for use by a transportation professional according to another exemplary embodiment.

Input is manipulated internally and integrated through traditional linear, "matrix," or multi-level, cross-access "texotrix" methodology (described below). In the embodiment depicted in FIG. 6 the central operating program assesses the relationships of input data through a three-dimensional logic based decision-making algorithm. FIGS. 4, 5 and 6 provide the user with up-to-the-minute, operating information available for pre-flight, en route, post flight or future operations. The pilot can access incremental feedback, monitor, or make adjustments at any point. Processing includes recording, copying, filing, updating, organizing, printing, and generating data, literature, schedules, routing, planning, computations and permutations of all phases of the flight needed at any given point in time.

A texotrix-weave is, similarly, a three-dimensional woven fabric containing the elements of an operating computer system. The weave may include, but is not limited to, the interweave of fullerenes such as nanotubes, grapheme, ultra-thin conductive free-standing PEDOT/PSS nanofilms, ultra-thin metal films, micro-superconductors, and other computer parts and peripherals. A texotrix-weave may be substantially flexible.

In an exemplary embodiment, a texotrix-weave may be used to form apparel, such as a flight suit 1100 as depicted in FIG. 11. The texotrix-weave may act as the fabric of the suit 1102. A texotrix-weave may also enable the functionality of various devices embedded within such a suit. For example, the suit may have a power source 1104, silicon chips 1106, programmable logic devices, cameras 1108, in-put keys 1110, solar/reflective capacitors 1112, antennae 1114, speakers 1116, microphones 1118, displays including but not limited to heads-up displays 1126 and whole suit soft displays, and various sensors including thermo-electrical sensors. An exemplary embodiment of EKB integrated apparel may have speakers 1116 embedded in the collar, a stowable visor with a heads-up display 1126 affixed to the collar, a plurality of antennae 1114 proximate a shoulder portion for receiving and sending/transmitting data, and a plurality of telescoping microphones 1118 proximate a chest portion. There may be cameras 1108 disposed around the suit so as to capture images of the surrounding area. The whole suit may include a soft display surface so that the captured images may be displayed on the suit. There may be a keyboard 1110 disposed on the forearms of the suit and silicon chips or programmable logic devices embedded in the sleeves and pant legs. There may be solar/reflective power pack capacitors 1112 disposed on the chest portion. The suit may have deep pockets 1122 proximate the waist and a Teflon zipper 1124 that stretches from the front waist along the crotch seem to the back of the waist. There may also be thermo-electrical sensing and refracting gloves 1120 and rechargeable energy packs and energy generating devices in the shoes. EKB apparel similar to the exemplary embodiment described may achieve the functions of the other exemplary embodiments of EKBs as described throughout this application. Various alternate embodiments may also be envisioned to include additional devices and functionality described in this application.

EKB integrated apparel may include an entire EKB constructed within one or more pieces of apparel. The fabric itself may be utilized as a component part or parts. Enhancing peripherals are considered part of the EKB system. One embodiment is constructed as a one-piece jumpsuit (FIG. 11). Various types of fabrics may be connected to create a wearable unified operating device. Main design components consider wearability, flexibility and durability. Extremely lightweight, micro-sized and compact parts are optimum.

If hard-wiring, photo-optic cables or structural reinforcements may be used. These components can be sewn inside garment seams (seam-binding). These may include photo-optic lines and main connectivity wires that distribute small amounts of electric current and or data needed to run various functions of the device. These work as lightweight "arteries" within the system. Electrical and light transfer throughout the garment may depend on the encoding and electrical sources of the system. For example, if split laser technology is incorporated so that pathways might allow light of different wavelengths to carry data from multiple sources along the same cable, the optic material may vary. Enhancements in technology are leading toward clear communication through vacuums and air. The potential to utilize developing technologies in an EKB embodiment is paramount to the design. Most of the needed electricity can come from energy generating shoes, although additional electricity can be sourced from solar and reflective power pack capacitors located elsewhere on the jumpsuit. Solar cells convert light into electricity using the photovoltaic effect. Foldable solar panels are currently manufactured which can be used as part of a constructed garment. "Integrated photovoltaics" (IPV) can susten many small devices depending on the accumulators, power conditioning circuits, and amount of sun exposure. Thin-film solar photovoltaic amorphous silicon is available that is flexible enough to be attached to fabric in order to capture and produce energy.

Very small thermo-electrical sensors have been developed in conjunction with micro-fabrication technology. Micro-thin carbon fibers can distribute even heat to the hands and fingers, as well as read back heat variations via sensors for storage in micro-capacitors. The thermoelectric effect describes the creation of an electric potential between temperature differences (Seebeck effect) and converting current to temperature (Peltier effect). Both can be used in an integrated technology to store energy created by temperature differences and later re-use it as heat. Thermoelectrics coupled with nanotechnology has allowed the development of flexible fabrics that create electricity from heat or movement, offering an extra electrical source which can be incorporated into EKB apparel.

The energy generating shoes harvest energy generated by the human step, which produces power during both the swing portion and impact portion of a step. When the foot moves forward or back, or the foot steps down, the motion and compression can be stored as saved energy in a number of ways. In this embodiment, an exemplary method is an ultrathin crystal chip that converts pressure to electricity. Other methods include using moving gears which either create friction that can be stored in rechargeable batteries or run small generators that do the same thing. One example uses the small generator from a rechargeable flashlight so that the generator axle turns when you step down. Rechargeable battery packs can be stored inside the shoe itself, externally strapped to the body, in the lower seams of a garment (FIG. 11), or the generated electricity can be used directly via a USB connection. For example, the back of the shoe could connect via USB to the bottom of the garment which connects to the veined wiring system previously described. It may be anticipated that other electrical sources, storage methods, and electrical distribution schemes may be incorporated in future embodiments of EKB garments, as would be reasonably understood by a person having ordinary skill in the art.

The jumpsuit may include sensors woven into the fabric which interpret motion and translate it to active commands. Examples of motion sensors can be active or passive infrared, optical, magnetic, seismic (vibration), sound or radio frequency based. Feedback from these sensors can be direct to the operating system or displayed. Displays on the garment can be constructed by incorporating LED lights or PLEDs directly into the fabric. Incandescence (electric current resistance produces heat and light), electroluminescence (light without heat), chemiluminescence (chemically produced light), cathodoluminescence (light from bombarding electrons), triboluminescence (produced by breaking chemical bonds), photoluminescence (reactive to intense light) or biologic luminescence (enzyme driven) can be used within the texture of the weave or added as film layers to produce displays.

The fabric itself is designed to carry memory, ram, computer core technology and other necessary computing components. One embodiment uses a three-dimensional texotrix weave, where "nodes" are connected in a correlated, layered system. Another, for example, uses three layers of small fiber "balls" connected at the point they touch, while another version uses thread-like filaments woven as a tapestry, and another version might layer synthetic, biologic, and natural layers into one. Elements woven into the fabric might include the use of fullerenes such as nanotubes, grapheme, superconductors and or multi-core microprocessors. The result in each case is a wearable, fabric-type material used in the construction of the integrated apparel. Different areas of the suit can be constructed of different fabrics depending on the need and logistics.

Wide-angle micro-cameras around the suit, for example as a belt, can redisplay images on the fabric so that the entire suit seems to appear "invisible" within its surroundings. High-reflectivity fabrics can produce a similar effect by reflecting surroundings in mirror-like imagery and effectively hiding the wearer within the environment.

The embodiment of the EKB as apparel allows the operator to move about unencumbered while having full advantage of the technology of the systems and methods of the EKB apparatus. Lightweight, compact, and evolving technologies will add significantly to the variations of this embodiment.

Other embodiments may include "fashionable" designs such as one piece gowns and separates, tops such s t-shirts, button-down shirts, sweaters, bottoms such as jeans, pants, skirts, coats, sweaters and wraps, shoes such as boots and moccasins, and peripheral jewelry-type elements such as necklaces belts and hats, and fashion-only elements such as buttons, braiding and ribbon.

The processing algorithm operates as follows (for example): a unit of data, or calculation, is presented as input (the wind is 240/10) the result can be accessed immediately, (suggested runway at ORD is 22) or modified by adding another unit of data, or calculation (ice accumulating rapidly) with the result again capable of being accessed, (runway 32 longer, suggested better choice, in spite of wind) or modified (crew legality reaching hourly limit) results available, (runway 27 adequate, quicker access, legal compromise) or modifiable . . . (left wing heat becomes inoperative) and so on. See FIG. 6 for how the system can "think" and interpolate unrelated data sources.

Process information is presented as factual output usable to determine operating options: formula calculations to aid in decision-making and suggested "best choice" solutions.

Output solutions can include flight planning, en route decision making moderated by weather and operating factors, financial analyses of integrated choices, fuel computations, weight-and-balance, crew planning, passenger accommodation/satisfaction result prognostication, and statistics relating to associated elements of an on-time/safe flight/travel operation, and so on.

Generally, the EKB can make use of software, which may be retained on internal or external computer storage, or accessed by other means. This software can include an operating system which can allow data input, integration and manipulation of data, and data output by means of shell programs. The operating system can also include driver programs which can operate the hardware as described above.

These programs can include system function programs, which can manage the operations of the entire system environment, such as system responsiveness applications, active regions programs, management of multiple open applications and documents, or any other desired operational function. The programs can also include translation programs and programs which can implement API (application program interface) functions which can allow the input and output of disparate processes which use different program languages (for example C, C Sharp, D, JAVA, HTML, XML, asp.net and advanced programming languages) and can provide results in executable formats, allowing cross-talk between disparate processes and programs by means which include cross-referencing languages and matching and stacking protocols. The programs can include multiprotocol label switching (MPLS) mechanisms which can direct data from one network node to another using short path labels rather than complex network addresses. The programs can include interactive programs which can enable applications to be selected and rendered in dynamic modes such as de-cluttering, and changing-element calculations, as opposed to pre-composed information. The programs can include programs which allow consistence across and between various hosted applications, and assure compatibility with other flight-deck systems.

The EKB software can also include flight-organizing programs which can collect data and collate it under specific headings, such as aircraft logs and flight manuals, using browser and search-engine functions for ease of retrieval. For example, in some exemplary embodiments inputting "Engine Out" might generate a list containing the following items hyperlinked to their sources: check-lists, flying methods, alternate airports, passenger considerations, and fuel management algorithms. This can allow an operator to obtain links to all relevant and accessible information concerning the condition in one list. The programs can also include flight management programs which can contain maps, charts, and situational awareness programs. The programs can be updated using input programs and electronic update communication programs. The EKB software can include flight operating programs which can include but are not limited to weight-and-balance programs, wind analysis programs, airspeed, runway length, maintenance programs, and other algorithmic programs, current data for which may be accessed by, for example, the input provisions described above.

The EKB software can use a texotrix methodology. It can manipulate arrays of data sets organized in rows, columns and stacks. These data sets may be integrated using algebraic laws to facilitate the study of relations between data sets, used in reference to the processing of information in three dimensional levels.

The EKB software can also include flight navigation programs, static and interactive, such as flight and position mapping, following, and navaid and airway plotting, using airway, terrain and airspace charts, as well as maps which delineate weather, restricted areas, and charts which may be useful for special circumstances such as waterway or thermal core mapping charts. The software can also include flight control programs which by means of the transmission of electronic data, light, or other transceiver functionality, can control aircraft systems and flight controls. The software can also include flight data programs which can include electronically stored data such as manuals, checklists, rules and regulations, airport procedures, airport charts, logbooks, reports, online publications such as CDLs, MELs AIM, AIP, airline specifications and HAZMET tables.

The EKB software can also include programs which can monitor flight, engine performance, and other aircraft systems, such as hydraulics, pressurization, electrical and other instruments, and programs which can provide monitoring and control, both active and interactive, such as EEC programs. The EKB software can also include flight assistance and monitoring programs which can include applications for use by cabin crew, maintenance crew, ground services and airplane operations, including flight service, SOC and dispatch.

The EKB software can include data structuring programs which can format and manipulate data according to use, such as word, graph, grouping, calculating, web-building, and programming with relating sub-programs such as numerical formatting and calculating. The software can include media programs including those which handle files formats such as wma, wmu, asf, dvr-ms, mp3, avi/wav, meg, medi, aiff, au, jpeg, gif, pet, mac, msp, psp, pic, psd, pgm, png, raw, wpm, spm, or any other desired format. The software can also include communication programs which can allow internet and intranet access and functionality for the operation of infrared, radio, satellite, light-wave, motion detection and related transceivers and other hardware as desired, as well as linguistic processing and audio processing programs for use by audio hardware such as sound control levels and audio input.

The EKB software can also include terminal services client programs which can allow, for example, a remote user to "control" another computer by means of communication programs described above.

The EKB software can also include linking programs which can link and interface the programs described herein, by using plug-in framework and translation/API programs, which may vary in mark-up sequencing and language, to standardize executable language, and then by using organizing programs, such as those described above, to organize disparate data, which may then be sorted according to form and function, and accessed by means of flight management and operating programs, such as those described above, and displayed or accessed by visual, audio or other output provisions, such as those described above.

The EKB software can also include interactive programs which can allow data received and sent to be dynamically updated through the course of a flight by means of the communication hardware and software devices described above. The software can also include networking programs, which can allow multiple users to interact and share information through, for example, an intranet, internet, private network, or cloud computing system.

The EKB software can include surveillance, weather, terrain and radar programs. The software can include security programs which protect the integrity of the system, including permissions, error-messaging, anti-viral, anti-spam, firewall, system back-up, and any other desired system security program. The software can also include security programs which protect users, such as approved electronic signatures, photon encoding messaging, public/private key technology (PKI), governmentally secure data programs for use in high-level threat situations, and any other desired user security system.

The EKB software can also include training programs, including training programs for use of the EKB itself, in normal, abnormal and emergency situations, as well as any desired aircraft or flight operations or systems training programs. The software can include archival, history, and data retention programs, including previous content, bookmarking, tree expansion and page scrolling.

The EKB software can also include any other desired programs, apps, applets, mini-programs, bit-programs, and any other additional programs consistent with advancements in technology that will become available.

Output can be presented directly or indirectly, electronically, graphically, printed or displayed on the system screen, or through associated systems by way of cable, infra-red, printer, modem, wireless or any other compatible or available output transfer system.

Generally, the output provisions provided in the EKB can include display devices for displaying data to an operator including screens, projection methods such as heads-up, holographic, spectrographic, x-ray and gamma ray embodiments, and other peripherals as described below. These display devices can have a means for changing illumination based on flight conditions, manual and automatic, such as brightness controls, back-lighting, photo-sensitivity devices, and light polarization mechanisms, such as glasses, lenses, and related peripherals. These display devices can incorporate hardware consistent for the output, so that such output is clear, legible, audible, and quality consistent for usage on the ground and in the air while at rest, in movement, or in-flight, or in any other desired scenario.

The output provisions provided in the EKB can also allow an operator to output data, and can include ports and peripherals, printers, static and interactive devices, speakers, transmitters, amplifiers, multiple surfaces such as textile, glass, metallic, and devices which are light, thermal, aural, and movement sensitive. Communications device and hardware which may be present in the EKB include receivers, transmitters, and transceivers for ADF, marker beacons, LF, VLF, HF, VHF, UHF, ACARS, SATCOM, ARNC, wireless, and any other desired communication standard and related electronic device.

The EKB can also include data recording and storage provisions for data including raw data, video and audio, internal, external, and portable drives, drives and servers at remote sites, and drives and servers which exist ethereally as in internet stored version or "cloud" program.

The EKB can also include other hardware such as timing mechanisms, as well as DSL, video, television, and associated hands on and remote control devices and components which can be used to accomplish the purposes of the system herein described.

The EKB can have construction characteristics consistent with its intended use, so that, for example, the features, buttons, control devices, and peripherals are of a size and shape to be manageable in a cockpit environment under even adverse flight conditions. For example, the EKB can make use of magnesium or composite with nested parts, so that should the computer and associated elements be dropped or jostled in turbulence their performance will not be deleteriously affected. The EKB can be constructed with sufficient strength and durability that it can withstand the potential rigors of flight and transport, including constant and repetitive pressure changes and the potential for exposure to rapid decompression. The EKB can be designed in such a way that the shape, size, and weight of the main unit are useable in a cockpit environment. In this manner, the EKB can be provided in tablet form, pocket-size, ultra-miniature, full-screen, foldable, stowable, wearable, biologically transplantable, round, symmetrical, asymmetrical, or any other desired configuration. In some exemplary embodiments, the EKB may also be transparent, or embody remote architectures which render the main unit invisible. The EKB can be tested to preclude radio magnetic, electromagnetic, and radio-sonic interference, and weather-related interference such as lightning as desired. The EKB can be designed to anticipate future construction equivalents in the realm of, for example, fluid, chemical and biological embodiments.

The EKB can also include peripheral devices which can interface with the hardware and software described above. These peripherals can include any desired technology, for example printers, scanners, projectors, and robotic devices. The peripherals can include displays, including glass, metal, biologic, holographic, and alternative displays such as wearable displays including textile and alternative material displays. The displays can take the form of interactive headgear, heads-up displays, ergonomically designed knee-top style displays, or any other form of display as desired. The displays forms and formats can be updated and interchangeable, including among the ilk of touch screens, registered retinal feedback loops, bio-feedback activated sensors, and neuroelectrically activated types, and can be of any desired size and form factor, including widescreen, tablet, pocket, curved, flexible, and miniature displays, as well as manifest in other physiological sense formats such as audio or electrical impulse only.

The peripherals can include writing pens, styli, brushes, fingerpads, and other accoutrement devices associated with computer operations. The peripherals can also include cables, blue tooth, infrared, and other hard-wired and wireless connection devices which may be used for connectivity to power sources and to the aircraft, such as, for example, serial to USB adapters, firewire, thunderbolt, HDMI, or other interconnectivty formats.

The peripherals can include power sources such as integral, external, and battery DC capabilities, AC power capabilities, and back-up power, such as emergency DC batteries, handcranks, bioemitting diodes, or solar capacitors. The peripheral power sources can include integrated, internal world-wide power adaption capacity, so that, for instance, 110V power and 220V power may both be translated into DC power for use by the device, as well as external plug-in type adapters such as auto/air and travel type adapters. The peripheral power sources can also include alternative power sources such as magnetism, solar, wind, bionic, biologic, hydrogen, molecular, electron, nuclear, telepathic, telekinetic, or any other desired power source.

The peripherals can include docking provisions which can allow the device to be optionally connected to an aircraft for purposes of using aircraft power to power the device or to recharge or replace the portable batteries. The docking provisions can also allow direct electronic data transfer via plug-in couplings from the ACARS, NAV system and other aircraft data resources by means of canon plugs, cables, male/female slotting devices, or any other associated or related hardware.

The peripherals can also include attachment provisions for securing the device to an aircraft, a user, or in any other desired fashion. The attachment provisions can take the form of straps, Velcro, sticky bean-bags, buttons, snaps, zippers, or other attaching devices as desired.

The EKB can also include the capability to be updated and upgraded as desired. As the EKB augments the traditional "pilot kit bag," the contents of the EKB, like the contents of the traditional kit bag, are intended to be updated and kept current by whatsoever means are most advantageously accommodating per recent technological advances, whatever the state-of-the-art might be, including all components described above.

Figure 7:
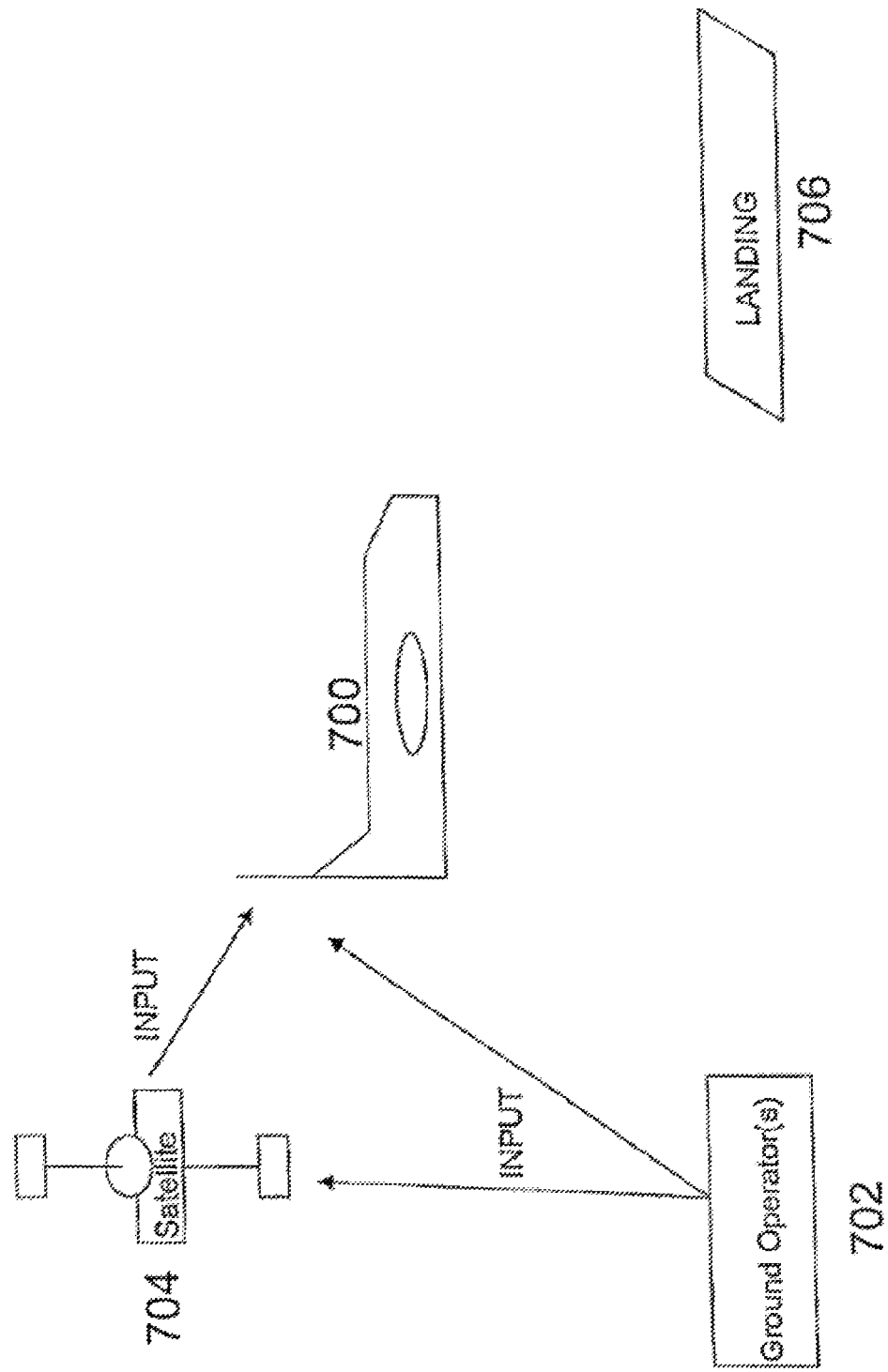
FIG. 7 is an exemplary diagram depicting a potential application of an EKB as part of a system for active control of an operating transportation craft.

The EKB data output can be formatted to be utilized either directly by the end user, an intermediate user, by a user through an aircraft system, or directly from the device to an aircraft system or autopilot. The EKB includes the capability of being interfaced directly with the aircraft, auto-pilot style, through "hard-wired" methods (by either directly attaching a device to the systems as with electronic pins, for example, or by cable attachment, plugging a unit connector cable directly into the autopilot or specific system computer bay), or cable-free, such as infrared (for systems so modified to assure compatibility), electronic, or other information exchange systems. FIG. 7 is an exemplary diagram of the process defined by the transmittal of data from a Ground Based Operator System 702, through an on-board combined-functions device in Operating Transportation Craft 700, resulting in the manipulation or active control of Operating Transportation Craft 700 that can be established in the following manner: an EKB interfaced with Operating Transportation Craft 700 includes receptivity to input in the form of voice activated commands or electronic data transfer from either Ground Operators 702 or Satellite 704 solely or in conjunction, and can output directly to aircraft control systems. Thus, functional radio control of the aircraft can be established from ground based personnel or equipment in emergency situations, such as pilot incapacitation.

Figure 8:
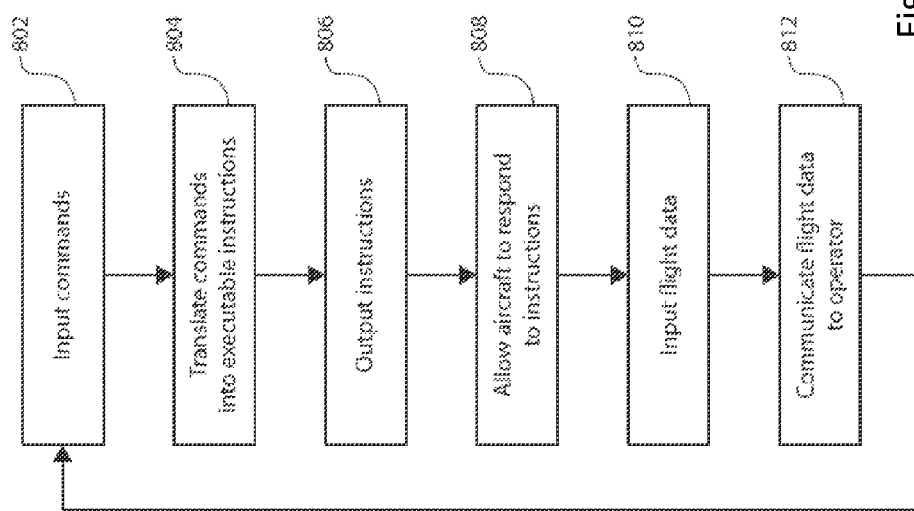
FIG. 8 is an exemplary embodiment of a process for manipulating and maneuvering an aircraft.

FIG. 8 shows an exemplary embodiment of a process in which an aircraft is manipulated or maneuvered using the EKB. This aircraft can, for example, be an Operating Transportation Craft 700 as described above and illustrated in FIG. 7. In some exemplary embodiments, the EKB can be used for the purpose of manipulating and maneuvering an aircraft by an on-board operator, by a remote operator such as a Ground Operator 702 or Satellite 704 as described above and illustrated in FIG. 7, or according to a previously planned or continuously updated automatic program scenario. In these embodiments, the EKB can interface with the navigation, mechanical, and operational systems of the aircraft as described above, including for example the auto-pilot, flight controls, flight systems, FMS, navigation instruments and systems, and radios including ACARS and SAT-COM.

FIG. 8 shows an exemplary embodiment of a process in which an aircraft is manipulated or maneuvered using the EKB. At step 802, aircraft commands are input into the EKB. In some exemplary embodiments, these commands can be input by an on-board operator. These commands can be input using any desired input provision, including a manual keyboard, touchpad, touch-screen, soft-key, cursor control device, voice recognition, touch recognition, movement recognition, voice recognition, sound recognition, retinal recognition, microphone equipment, telephone and DSL ports, disks (soft, hard, floppy, CDs, DVDs, or any other desired disk), disk drives, flash drives, USB, hotwire, firewire, infrared, ACARS, VHR, HF, AIRINC, Ethernet LAN, GPS, satellite transceiver ports, scanning, faxing, wireless data acquisition and control systems, any other input provision as described above, or any desired input provision.

Still referring to FIG. 8, in some exemplary embodiments the commands of step 802 can be input by a remote operator, for example a Ground Operator 702. These commands can be relayed to the EKB using receivers, transmitters, and transceivers for ADF, marker beacons, LF, VLF, HF, VHF, UHF, ACARS, SATCOM, ARNC, wireless, any other communication provision described above, or any other desired communication standard and related electronic device.

Still referring to FIG. 8, in some exemplary embodiments the commands of step 802 can be input according to a previously planned or continuously updated automatic program. This program can be stored in or transmitted to the EKB as described above or otherwise as desired. This automatic program can be triggered by any desired condition, for example a distress signal activated onboard or remote from the aircraft, a preset internal environmental condition such as loss of aircraft cabin pressure, lighting, electronics, hydraulics, or any other system, a preset external environmental condition such as loss of altitude, inclement weather, anomalous sensor reading, or by other desired conditions such as sustained period of detected pilot inattention.

Still referring to FIG. 8, at step 804 the EKB can assess the commands input in step 802 and use the translational/ABI/API strategies and programs as described above to re-format, adjust, stack, interface and otherwise manipulate the commands into executable instructions relative to the aircraft systems as necessary. The executable instructions can include language directed to navigation, communication, warning, mechanical, operational, or any other systems as desired.

Still referring to FIG. 8, at step 806 the EKB can output the executable commands into the aircraft's navigation and operating systems by using an interface between the computer and the aircraft. This output can be accomplished using any hardware, software, or peripheral as described above, or using any other output scheme as desired. In some embodiments the executable commands can be output using hard-wire-type interfaces, such as canon plugs and USB connections directly plugged into the operating functions of the aircraft including the primary electronic flight control computers and navigation systems, the autopilot, and the FMS computers. In some exemplary embodiments, the executable commands can be output using a wireless interface. This wireless interface can be a short-wave interface, for example infra-red, a medium distance wireless, for example IEEE 211 (a,b,c), a long-range wireless connection, for example a SATCOM, HF, UHF, or ARINC transceiver, or using any other data transfer systems as desired.

Still referring to FIG. 8, at step 808 the EKB can allow (via permissions if necessary) the aircraft computers and operating systems to respond to the EKB executable instructions issued in step 806 as they would respond to other normal command inputs.

Still referring to FIG. 8, at step 810 the EKB can input the flight data results of the aircraft navigation, flight, and operational systems back to the EKB computing device, through the same or other data transfer linkages as described above. At step 812, the EKB can communicate these data to the operator or the automated program in control so that the operator or program can use the results to assess the effects of the command entered at step 802. The data can be output to an onboard operator using any desired output provision, for example screens, projection methods such as heads-up, holographic, spectrographic, x-ray and gamma ray projectors, or any output provision as described above. The data can be transmitted to a remote operator using any desired communication provision such as receivers, transmitters, and transceivers for ADF, marker beacons, LF, VLF, HF, VHF, UHF, ACARS, SATCOM, ARINC, wireless, or any other desired communication standard and related electronic device. The data can be output to an automated control program using any desired output provision, for example the output provisions described above. Based on the communicated data the operator or program can decide to return to step 802 in order input commands for a course correction or other change.

Figure 9:
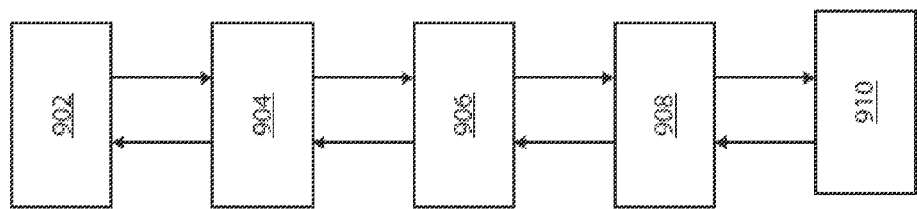
FIG. 9 is an exemplary embodiment of an interface between a pilot, aircraft and EKB.
Figure 13:
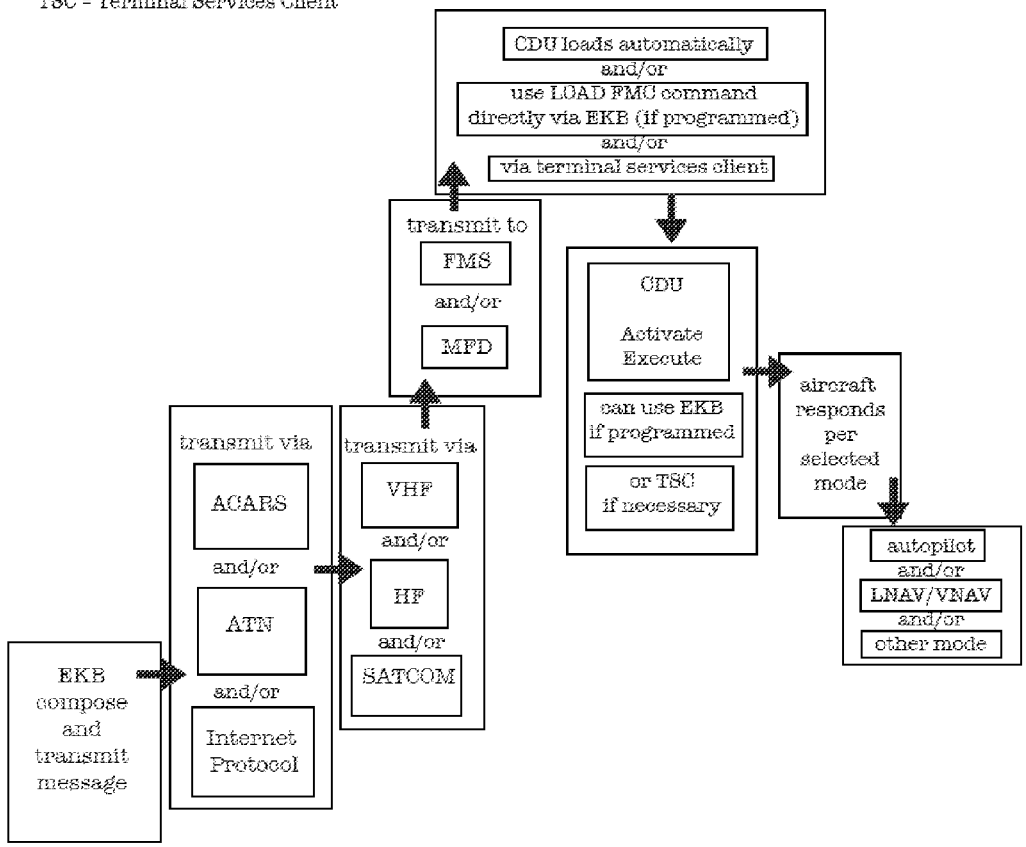
FIG. 13 is an exemplary embodiment of a command transmission between an EKB and an aircraft.

FIGS. 12 and 13 show exemplary embodiments of a process in which an aircraft is manipulated or maneuvered using the EKB. FIG. 13 details specific series of transmissions and computer executions that may take place to control a craft, in accordance with the steps shown in FIG. 8. FIG. 12 shows an alternate embodiment that may follow a series of events similar to those depicted in FIG. 13. An embodiment as shown in FIG. 12 may use a neuro-electrical transmitter or a registered retinal amplifier with feedback as an output source FIG. 9 shows an exemplary embodiment of an example interface between a pilot, aircraft, and EKB. Element 902 represents aircraft sensors, receptors, or transmitters. Sensors 902 can be any type of antennae or sensors as desired, and can receive or transmit information and data to and from a pilot or other user. This information or data can be relayed to and from the aircraft by relay 904, which can be any type of communication relay as desired, for example an electromagnetic focusing replicator or SATCOM. This relay can receive and transmit information and data from the EKB, which can display this information on display 906. Display 906 can be, for example, a deep screen holographic display, and can be used by a pilot or user to access the information or data from the aircraft or any other information. The pilot or user can make use of other devices to assist in interacting with the EKB, for example a neuro-electrical transmitter 908 or a registered retinal amplifier with feedback.

Figure 10:
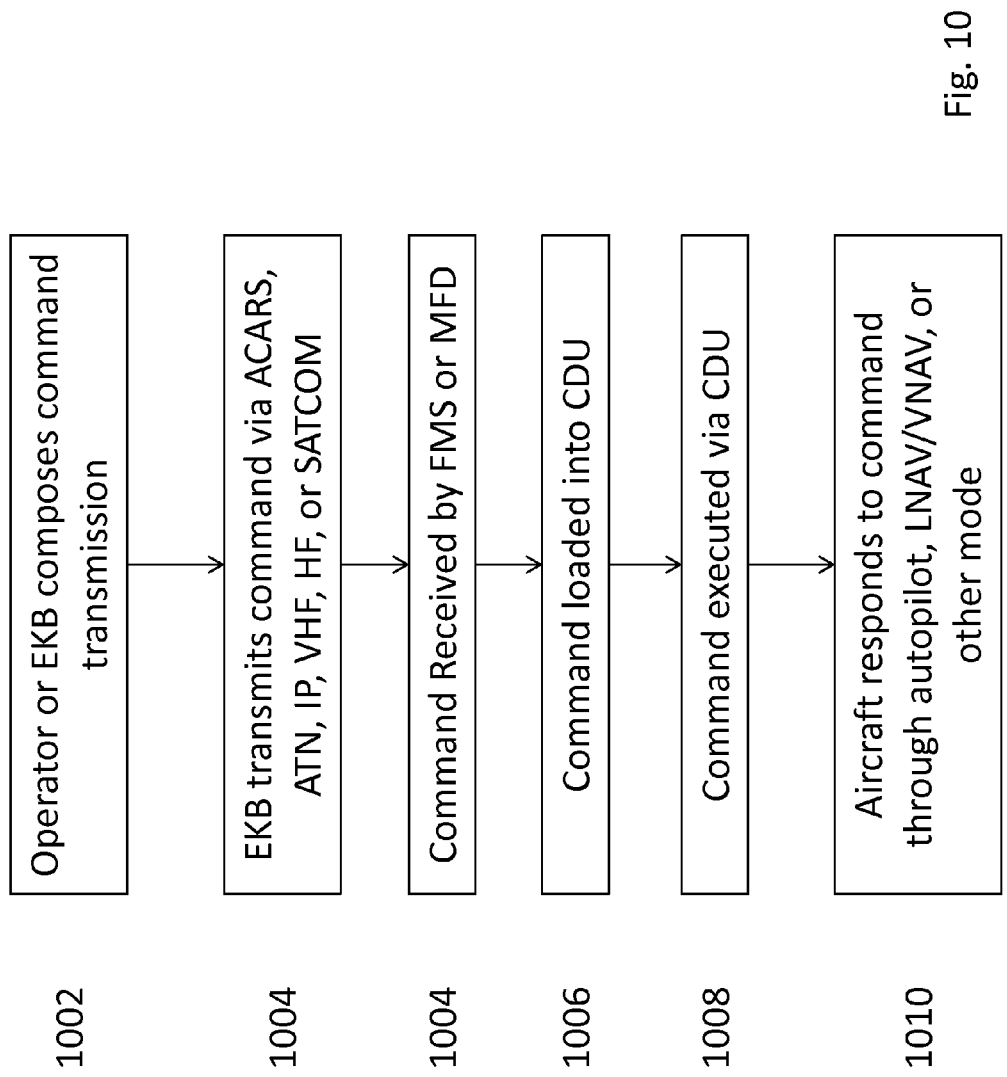
FIG. 10 is an exemplary embodiment of a command transmission between an EKB and an aircraft.

FIG. 10 shows an exemplary embodiment of a command transmission between an EKB and an aircraft. At step 1002, the EKB or an operator via the EKB composes a command transmission. At step 1004, the EKB transmits the command to the aircraft using any desired method or medium of transmission, for example ACARS, ATN, IP, VHF, HF, or SATCOM. At step 1004, the command is received by the FMS, or is received and displayed on the MFD. At step 1006, the command is loaded into the CDU, either automatically, or via a LOAD FMC command from the EKB, or via a terminal services client, or by any other desired process. At step 1008 the command is executed by the CDU, and at step 1010 the aircraft responds to the command, either through autopilot, LNAV/VNAV, or any other desired mode.

In this manner, an onboard or remote operator, or an onboard or remote program, can fly the aircraft through the EKB. In one exemplary embodiment, by way of example, when a pilot wants to make a flight path correction, at step 802 the pilot can make a selection from a browser interface with the EKB, for example "aircraft control." The EKB can display a list, which can contain for example the selections "turn," "vertical speed," and "altitude." The pilot can select, for example, "turn" and input "turn left, 020 degrees." At step 804 this command can be interpreted by the EKB and translated into the appropriate instructions. At step 806 the EKB can output these instructions to the aircraft. At step 808, the aircraft can respond and turn left to 020 degrees. At step 810, the EKB can read the new heading from the appropriate aircraft system. At step 812, the EKB can communicate this new heading data to the pilot using an external display on the EKB and, depending on whether the pilot is satisfied with the heading data, can return to step 802 or refrain from returning to step 802.

In other exemplary embodiments, by way of example, the operator may input other commands such as "turn left 20 degrees," "nose down 2 degrees," "set power at 1.2 EPR," and through the means of data transfer described here, the airplane can respond, and send back the resulting aircraft indications by the same means for further interactive responses as necessary.

In other exemplary embodiments, the EKB can for example display all command entries on one source selection page, so that, for example, "turn, vertical speed, and altitude" may be entered all manually on one selection page, or by a series of voice commands, or by other entry methods, such as registered retinal feedback.

As another example, in one exemplary embodiment a remote operator such as a Ground Operator 702 can manipulate and maneuver an aircraft in flight through the use of an EKB. The operator can activate the EKB and use it to locate and identify the aircraft to be maneuvered. The aircraft can be identified, for purposes of security, communication, and control by its airline call-sign, aircraft number, and/or SEL-CAL/ACARS identity. In this embodiment, these identifications can be a call sign of "American 123," an aircraft number "7BK" or "Seven Bravo Kilo," and a SELCAL/ACARS identity of FG-HJ or "Fox-Gulf-Hotel-Juliet."

The user can then establish SELCAL/ACARS communications between the EKB and said aircraft and use one or more iterations of the process described above and illustrated in FIGS. 8, 12, and 13 to maneuver the aircraft. At step 802, the operator can compose a command message on the EKB, such as a flight plan to a destination airport, including descent and landing instructions. These command messages can be electronic data messages which can be processed by the aircraft's computers. At step 804, the EKB can send this flight plan information, via datalink, to the aircraft's FMS in the same manner that flight-plans are currently uploaded, for example via VHF and SATCOM. In other exemplary embodiments this information can be sent through ACARS to the MFD, then through the MFD to the CDU, as is currently routinely done with ATIS, ATC clearance delivery, load-closeouts, and company communications. In other exemplary embodiments, this information may be sent directly to the MFD, then through the MFD to the CDU, as is currently and routinely done with ATIS and ATC communications.

At step 806, this information can be loaded in the FMC, where it can be displayed in the CDU automatically, as flight plans are normally loaded, or by using the LOAD FMC command, where the selection can be made by the operator of the EKB. This selection can be made by means of a terminal services client or remote access which can allow a remote user to "control" another computer from a distance.

Still at step 806, the EKB can "activate" and "execute" the uplinked and loaded command data automatically, though programming, or by command, where the selection is made by the operator of the EKB, by the means described above. This can cause the transferred data to become the active route and allows the inputted data to become the source of aircraft control commands when the autopilot is engaged, and under other circumstances as describe in the aircraft operating manual.

Once the flight plan has been loaded into the CDU, "activated," and "executed," the aircraft can be linked to the sent program through normal operating components of the auto-flight system, and with the autoflight system engaged, and in VNAC and LNAV modes, for example, the aircraft will fly the route specified in the flight plan uploaded from the EKB. Thus, through one or more iterations of the process described above and illustrated in FIGS. 8, 12, and 13, by messaging flight commands from the EKB, via standard communications links, to the FMS, and activating and executing these commands by the methods described, the aircraft can be maneuvered from take-off, in-flight, and through touch-down and landing.

This means that, in this exemplary embodiment, by messaging flight path, altitudes, speeds, approach selections and other flight commands, from the EKB, as described above, directly or through SATCOM or other electronic relay system to the aircraft's FMS or autopilot, an aircraft can be maneuvered in whole or part by an operator of the EKB, or via an EKB through an emergency automatic program, or through a remote EKB linked to an onboard EKB which may be hardwired to aircraft systems.

Similarly, a series of EKBs controlled individually or collaboratively, for example, by a remote pilot(s), emergency service team, and/or an FAA air-traffic controller, may be used to relay maneuvering data through a hardwire or wireless interface.

It should be noted that the computer hardware and software may be updated and revised, without changing the embodiment of this invention. With the rapid advancement of technology, the precise hardware and software involved in this description can evolve, but the integrity of the concept remains within the embodiment of the structure and methodology of this invention, and such variations are not to be regarded as a departure from the spirit and scope of the invention.

FIG. 4 shows a current standard for a linear (i.e. one dimensional) decision-making process used by a transportation professional such as a pilot. Pilot 400 receives information as Input 402 from flight operations regarding a flight plan which includes departure point, destination, alternate airports, and fuel time. Pilot 400 then reviews and uses the information leading to Output 414; then Pilot 400 acquires a weather briefing as Input 404. Then that information is used by Pilot 400 leading to Output 414; then Pilot 400 acquires information about crew scheduling and other limitations regarding the time the crew has been on duty for this particular mission as Input 406. Additionally, Pilot 400 acquires maintenance information about the plane from the log book on the airplane, from pilot briefings and/or from the mechanics as Input 408. Additionally, information as Input 412 is obtained about passenger concerns, e.g. particular passenger information as well as the passenger manifest and information as Input 410 about the cargo, e.g., types of cargo, restricted items, livestock, etc. With this information, as it comes incrementally and linearly to Pilot 400, Pilot 400 makes modified decisions about the flight as Output 414.

FIG. 5, improvement No. 1, is a diagram showing a matrix (i.e. two-dimensional) decision-making process for use by a transportation professional such as a pilot. Information such as Input 502 is acquired by Pilot 500, as additional information such as Input 504 is given to Pilot 500, the prior information learned from Input 502 by Pilot 500 is used in supplying the next new information from Input 504 to Pilot 500. So that, for example, the first linear information received as Input 502 by Pilot 500 would be the flight operations in this example, before the next information from Input 504 is given to Pilot 500, the weather information from Input 504 given to Pilot 500 is adjusted (e.g., Input 504 is modified by an EKB rendering calculations) based on the flight operation from Input 502 so that Pilot 500 can either access the information directly as Input 502, e.g., from flight operations, or he can access the weather information from Input 504 so that the flight plan from Input 502 is modified by the influence of the weather information. Likewise, when the third element is added as Input 506, for example, crew limits, when that information is fed to Pilot 500, an EKB can modify or suggest a flight plan to be within the limits of the crew. Specifically, this improvement No. 1 ensures that the crew limits from Input 506 will be taken into consideration notwithstanding whether Pilot 500 was thinking about that particular limitation or any of the other limitations or data being fed to him. The program figures the limits based on the flight operations plan from Input 502 in the particular circumstances. For example, there are different limits based on whether the flight is domestic or international. Specifically, a crew may only have a certain amount of time left on that leg of the trip which may be shorter than the flight mission which could present a problem to Pilot 500. This improvement No. 1 takes into consideration the crew limits from Input 506 whether or not Pilot 500 actually considered the same and this way the improvement No. 1, flight operations plan from Input 502 is adjusted according to the weather from Input 504, the crew limits from Input 506, the maintenance from Input 508, the load from Input 510 and the passengers from Input 512. Another example is for the load from Input 510. The final weight and load of the plane and passenger quantity under some circumstances is figured out by a pilot especially including variables such as fuel, weather and destination. Under this improvement No. 1 system, for example, if at the time of take off it was starting to rain and it was necessary for Pilot 500 to figure out a new runway length as Output 514, all these calculations can be done by the computer and assessed in real time leading to Output 514 as opposed to having Pilot 500 have to research his individual paper manuals as it is presently done for new factors in view of the rain in regard to, for example, take off length, runway length, speed of the airplane under moisture conditions and other adverse conditions. Improvement #1 cumulative adds step by step information, modifying the result mechanically as needed.

FIG. 6, improvement #2, is a diagram showing a texotrix (i.e. three-dimensional) decision-making process for use by a transportation professional such as a pilot, wherein the point of analysis/re-analysis of input/ouput can occur at any point. Computer System 616 generally returns to the beginning step and reassesses all factors based on all present factors from Inputs 602, 604, 606, 608, 610 and/or 612 that System 616 knows, such that the points of analysis made by System 616 for use by Pilot 600 is re-analyzed with the newest input and output that occurs at any point along the way. In this situation, Pilot can (Option 1) review the information and make a decision as Output 614, (Option 2) allow the computer to solve some of the questions and base decisions leading to Output 624 on personal knowledge and the information provided by the computer, or (Option 3) allow the computer to control and make the decisions as Output 634.

The use of the term "texotrix" (L. texus, to weave, seen also in texture, textile, context and L.-trix, as in matrix) is that of the inventor, meaning an array of elements in rows, columns and stacks, treated as a unit using special algebraic laws in facilitating the study of relations between elements, used herein in reference to the processing of information in three dimensional levels. Texotrix patterns may mimic manmade, mathematical, or biological arrays such as fabric weaves, sphere packing, fractals, non-Euclidean tessellations, or DNA structures. Similarly, a "texotrix" fabric weave describes a fabric wherein components are layered and intermingled in a three-dimensional cross-referencing system, so that, for example, in one embodiment, a solar conducting thread can be woven together with an electrical conducting thread, and a coolant thread to create a type of fabric that both stores and conducts electricity while it stays cool to the wearer.

Summarizing, the present invention is a portable, computerized, electronic kit bag (EKB) consisting of standard and state-of-the-art computing parts and peripherals, interfaced for maximum utility, a central operating program which assesses the relationships of input data through a three-dimensional logic based decision-making algorithm, an EKB data output formatted to be utilized either directly by the end user, an intermediate user, by a user through an aircraft system, or directly from the device to an aircraft system or autopilot.

The EKB can encompass a process defined by the transmittal of data between an onboard or remote user operator or system, and an on-board unit, system, or combined-functions device, resulting in the manipulation or active control of an operating transportation craft.

An EKB may have a translucent secondary window designed for the purpose of overlaying "heads-up" display information directly over maps, charts or other data displayed by a primary computer screen; and an all-in-one interactive headgear interfaces with an EKB. Optionally an EKB may be in the form of an ergonomically designed knee-top style EKB. Other embodiments of the EKB may be manifest as "wearable" computing, or be comprised of computing elements woven into wearable accoutrements. The EKB may be designed of woven silicon or natural or synthetic fabrics which enable parts or whole operative functions. A "texotrix" layering of electronic fabric(s) and components may be used in the physical construction of the device.

The EKB can be linked, as needed, to peripherals and aircraft systems, by plugging in optional cables and components, or establishing wireless, remote or other interface connections. Data can be inputted to the EKB by those components and mechanisms as described above, where the operator can select which sources are necessary to perform any given function. In this manner, for example, before a flight, a pilot can input maps and charts, for example, by an internet or intranet upload method. During a flight, a pilot can input weather information, for example, using an ACARS connection uplink method. While maneuvering, for example, a pilot can input performance data, for example, via an aircraft FMS link. While in descent, the aircraft attitude altitude and speed can be fed to the EKB via an electronic feedback loop from the autopilot system.

Data which has been entered can be manipulated as needed by the programs described above, so that, for example, data can be collated and organized. Data can be manipulated by an ABI or API program, then grouped and sorted by a browser and search function, and selective data can be accessed by various computational programs. These functions can perform automatically in some cases, as for "background" and linking programs.

These programmable functions can provide data and data sets which are continuously inputted, updated, and re-outputted for a smooth and un-interrupted data transfer loop between the EKB system and the aircraft.

These function can also perform "on demand" as called for by the pilot, operator, or system, depending on the functions in use. In this manner, data which has been successfully manipulated, depending on which programs are being used, can outputted by the components and means discussed above. Then data which has been successfully outputted can be displayed by the output provisions described above, or forwarded to another program, system, or directly to an aircraft mechanism. The process can result in tasks and functions being accomplished which aid the pilot/operator.

The following discussion is a working example allowing a user, practicing at least one embodiment of the invention, to organize and manipulate disparate data and functions, and may consist of, inter alia, the following steps;

(a) the electronic computational device is started;
(b) the user selects the browser function;
(c) the user selects from amongst a series of icons with linking capability to, for example, a connection function, a search function, a tools function, a programs function, or a control function;
(d) the user selects an option from the browser, in this embodiment, SEARCH FUNCTION, and opens the program;
(e) data is inputted into the search function by the user, in this embodiment, ENGINE OUT;
(d) a list is presented with hyperlinked options, in this embodiment, AIRSPEEDS, ALTERNATE AIRPORTS, CHECKLISTS, LANDING WEIGHTS, REPORTS;
(g) the user selects an option, in this embodiment, ALTERNATE AIRPORTS;
(h) a list of alternate airports is displayed;
(i) the user selects an alternate airport;
(j) the data about that airport is displayed with additional links to related topics and functions, in this embodiment, CALCULATE TIME TO AIRPORT, CALCULATE FUEL TO THE AIRPORT; and
(k) the user continues with the search tree, selecting another option or returns to the main menu, depending on the program and search function in use; alternatively,
(l) when the user wants to make a calculation, data is inputted into the search function by the user, for example, ENGINE OUT;
(m) a list is presented with hyperlinked options, in this embodiment, AIRSPEEDS, ALTERNATE AIRPORTS, CHECKLISTS, LANDING WEIGHTS, REPORTS;

(n) the user selects an option, for instance, AIRSPEEDS;
(o) a list is presented, in this embodiment, LANDING and GO-AROUND;
(p) the user makes a selection, such as LANDING;
(q) a list is presented of airspeed/landing functions, in this embodiment, REFERENCE SPEEDS;
(r) the user selects the desired function and inputs the prompted data, in this embodiment, WET/DRY;
(s) the user continues to input prompted data, in this embodiment, WIND COMPONENT; and
(t) the system calculates and outputs the needed airspeed;
(u) the user may continue the search tree, select another option, or return to the main menu, depending on the program and search function in us; alternatively,
(v) when the user wants to make a decision, data is inputted into the search function by the user, in this embodiment, ENGINE OUT:
(w) a list is presented with hyperlinked options, in this embodiment: AIRSPEEDS, ALTERNATE AIRPORTS, CHECKLISTS, LANDING WEIGHTS, REPORTS;
(x) the user selects an option, in the current embodiment, LANDING WEIGHTS;
(y) a list is presented, in the current embodiment, CURRENT WEIGHT and CALCULATED WEIGHT;
(z) data is outputted, in this example, LANDING WEIGHT IS 500,000 POUNDS, TOO HEAVY, DUMP FUEL;
(a') the user is presented a decision-making option; alternatively,
(b') when a user wants to make a report, data is inputted into the search function by the user, in this example, ENGINE OUT:
(c'), a list is presented with hyperlinked options, in this example, AIRSPEEDS, ALTERNATE AIRPORTS, CHECKLISTS, LANDING WEIGHTS, REPORTS;
(d') the user selects an option, continuing the search string, REPORTS;
(e') a list is presented containing, in this example, ATC, COMPANY, OTHER AIRCRAFT;
(f') the user makes a selection, in this example, COMPANY; and
(g') continues to a screen for sending a report, if sending a report is required, the functioning program method will, in this embodiment;
aid in composing the report;
aid in addressing the report;
send the report in an email format;
selecting connectivity as hardwired or wireless, depending on the connectivity selected in this particular embodiment, which may be variable, depending on the choices of hardware and software; alternatively
(i') when a user wants off-line training;
(j') data is inputted into the search function by the user, in this example, ENGINE OUT;
(k') a list is presented with hyperlinked options, as discussed above
(l') the user selects an option;
(m') the selected option is outputted for study and review by the user.

The above discussion represents merely a sampling of optional functionalities of the EKB, as the selections of accessed potentially interfaced programs are myriad, and only partial subsets of capabilities are here reviewed. For example, a search-string can be bypassed by directly accessing a desired function. In addition, data which the operator has successfully acquired by any means can be used for the purposes of flight management, and can additionally be manually or automatically re-inputted. As a result, for example a value derived from a functions program can be re-inserted into a calculating program, which can result in the logic loop beginning again at the input stage noted above.

In some exemplary embodiments, the EKB can be used from a "stationary site," such as on a table set on the ground, meaning the computing device is stationary relative to the surface of the earth. In some exemplary embodiments, the EKB can be used from a "moving site," including in automobiles, boats, or aircraft, meaning the computing device is moving relative to the surface of the earth. The EKB can be used within or exterior to the craft it is controlling whether it is in motion or stationary. In some exemplary embodiments, the EKB can be used from an orbital, or non-earth-centric site such as space-stations or space-craft.

The Electronic Kit Bag is conceived as a system that is not hardware, software, or component dependent, but rather conceptually and mechanically evolving, anticipating future incremental improvements, within the scope of the herein described purpose of the device, namely organizing, managing, manipulating, and outputting data, as well as integrating that data so that the device can be used as a portable interactive decision and support tool for flight operations, and even aircraft control. Accordingly, it is intended that this invention not be limited to these specific illustrative embodiments, but is to be interpreted within the full spirit and scope of the appended claims and their equivalents.

In summation, acknowledging that with the rapid advancement of technology, the precise hardware and software involved in this portable electronic flight system will evolve, but the integrity of the concept remains within the embodiment of the structure and methodology of this invention, and such variations are not to be regarded as a departure from the spirit and scope of the invention.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for using a portable, computerized aircraft flight system, comprising:
inputting commands and flight data into a portable device configured to display, organize, manage, manipulate, and output flight data and instruct aircraft control systems, wherein flight data comprises flight logs, flight operating manuals, airport procedures, weather information, aircraft crew scheduling information, aircraft maintenance information, aircraft load weight and balance information, navigational data and aircraft attributes, and wherein the portable device is a wearable computer comprising computing elements woven into wearable accoutrements, and is configured to be operably worn by a person when on-board the aircraft and when external to the aircraft, wherein the woven fabric further comprises an interweave of fullerenes, capacitors, integrated photovoltaics, logic devices, photo-optic lines, thermo-electrical sensors, micro-thin carbon fibers for distributing heat, luminescent threads forming soft displays, at least one of ultrathin crystal chips for converting pressure into electricity or movable gears for generating electricity from friction, and at least one active or passive motion sensor for capturing motion to be translated into commands;

translating the commands via software programs on the portable device into instructions executable by the aircraft, wherein the software programs comprise three-dimensional logic based decision-making algorithms configured to account for the flight data;

outputting the executable instruction to the aircraft via the portable device;

allowing the aircraft to respond to the executable instructions;

receiving, reading, and interpreting data from the aircraft via the portable device; and deciding based on the data whether to input new commands into the portable device.

2. The method of claim 1, wherein the portable device has hardware with one or more processors; memory; data input means, for permitting a user to input data; a display for displaying data to said user; data recording and storage means; and a data output for permitting said user to output data;

a self-powering element for electrically operating said device independent of a fixed power supply;

a data input receiver that enables said portable device to receive data, wherein said data includes a first set of data from a data source in an input format compatible with said portable device and updated information;

a data deliverer for delivering said input and output data to said portable device; software, including an operating system and operating program, wherein said software is stored within said memory of said portable device, said software facilitates translating received commands into instructions executable by an aircraft and calculating a second set of data that is based on said updated information;

a data output transmitter that facilitates outputting said executable instruction to an aircraft; and an output interface that facilitates outputting said first set of data, said updated flight information and said second set of data from said portable device.

3. The method of claim 2 wherein said software comprises means of accessing said first set of data, said updated flight information, said second set of data and functions by means of an application program interface.

4. The method of claim 3 wherein the portable device uses a texotrix methodology, meaning an array of sets of data organized in rows, columns and stacks, integrated using special algebraic laws in facilitating the study of relations between data sets, used in reference to the processing of information in three dimensional levels.

5. The method of claim 2 wherein said data input receiver enables said portable device to receive data using wireless communications.

6. The method of claim 2 wherein said data output transmitter enables said portable device to transmit data using wireless communications.

7. The method of claim 2 wherein said data deliverer for delivering said data to and from said portable device is by means of an Intranet.

8. The method of claim 2 wherein said data deliverer for delivering said data to and from said portable device is by means of the Internet.

9. The method of claim 2 wherein said data deliverer for delivering said data to and from said portable device is by means of any private or public network.

10. The method of claim 2 wherein said at least one processor may be a programmable logic device such as multi-core multi-processors or alternatives thereof.

11. The method of claim 1 wherein the commands are input into the portable device by an operator located on the aircraft.

12. The method of claim 11, wherein the commands are input using at least one of a manual keyboard, touchpad, touch-screen, soft-key, cursor control device, voice recognition, touch recognition, movement recognition, voice recognition, sound recognition, retinal recognition, neuro-electrical recognition, microphone equipment, telephone and DSL ports, disks such as soft, hard, floppy, CDs, or DVDs, disk drives, flash drives, USB, hotwire, firewire, infrared, ACARS, VHR, HF, AIRINC, Ethernet LAN, GPS, satellite transceiver ports, scanning, faxing, or wireless data acquisition and control systems.

13. The method of claim 1 wherein the commands are input into the portable device by an operator located remotely from the aircraft.

14. The method of claim 13, wherein the commands are transmitted to the aircraft by at least one of receivers, transmitters, or transceivers for ADF, marker beacons, LF, VLF, HF, VHF, UHF, ACARS, SATCOM, or ARINC.

15. The method of claim 1, wherein the commands are input by an automatic program operating on the portable device.

16. The method of claim 15, wherein the automatic program is triggered to input commands by at least one of a distress signal activated onboard or remote from the aircraft, a loss of aircraft cabin pressure, lighting, electronics, hydraulics, fuel, or altitude, red warning or emergency alerts, inclement weather, an anomalous sensor reading, or a sustained period of detected pilot inattention.

17. The method of claim 1, wherein the executable instructions are directed to at least one of the navigation, communication, warning, mechanical, electronic, flight control, or operational system of the aircraft.

18. The method of claim 1 further comprising a communications means whereby said portable device communicates with data sources remote from said device while said portable device is en route with said aircraft.

19. The method of claim 1 wherein said portable device includes a flight planning component comprising:
   a flight planning applications software program;
   inputted a first set of data;
   an output data capability which is connected to an aircraft operating system, wherein said output data capability facilitates outputting a second set of data; and
   a continuous data update capability.

20. The method of claim 1 wherein said portable device is attached to vehicles other than aircraft.

21. The method of claim 1 wherein programmable functions provide data and data sets which are continuously inputted, updated, and re-outputted for a smooth and substantially un-interrupted data transfer loop between the portable, computerized aircraft flight system and the aircraft.

22. The method of claim 21 wherein the portable device uses a texotrix methodology, meaning an array of sets of data organized in rows, columns and stacks, integrated using special algebraic laws in facilitating the study of relations between data sets, used in reference to the processing of information in three dimensional levels.

23. The method of claim 1 wherein the portable device is a woven fabric comprising solar conducting thread, electrical conducting thread, coolant thread, optically conductive thread, sensors, fullerenes, processors, and display elements.

24. The method of claim 1, wherein the portable device is designed of at least one of woven silicon, natural, or synthetic fabrics which enable parts or whole operative functions.

25. The method of claim 1, wherein the portable device comprises a texotrix layering of one or more electronic fabrics.

26. The method of claim 1, wherein the portable device comprises a texotrix weave, wherein elements of an operating computer system are woven as a three-dimensional fabric; and wherein fullerenes, such as nanotubes, grapheme, superconductors, and multi-core multi-micropocessors are woven therein, integrated with the other components of the texotrix weave.

27. The method of claim 1 wherein the portable device uses a texotrix methodology, meaning an array of elements in rows, columns and stacks that may mimic man-made, mathematical, or biological arrays such as fabric weaves, sphere packing, or DNA structures, treated as a unit using special algebraic laws in facilitating the study of relations between elements, used in reference to the processing of information in three dimensional levels.

28. The method of claim 1, wherein the portable device uses a texotrix methodology, meaning an array of components in rows, columns and stacks, such as cores, treated as a unit using special algebraic laws in facilitating the study of relations between components, used in reference to the processing of information in three dimensional levels.

29. A portable, computerized aircraft flight device, comprising:
hardware with one or more processors; memory; data input means, for permitting a user to input data; a display for displaying data to said user; data recording and storage means; and a data output for permitting said user to output data;
a self-powering element for electrically operating said device independent of a fixed power supply;
a data input receiver that enables said portable device to receive data, wherein said data includes a first set of data from a data source in an input format compatible with said portable device and updated information;
a data deliverer for delivering said input and output data to said portable device;
software, including an operating system and operating program, wherein said software is stored within said memory of said portable device, said software facilitates translating received commands into instructions executable by an aircraft and calculating a second set of data that is based on said updated information;
a data output transmitter that facilitates outputting said executable instruction to an aircraft; and
an output interface that facilitates outputting said first set of data, said updated flight information and said second set of data from said portable device;
wherein the portable device is configured to display, organize, manage, manipulate, and output flight data and instruct aircraft control systems, wherein flight data comprises flight logs, flight operating manuals, airport procedures, weather information, aircraft crew scheduling information, aircraft maintenance information, aircraft load weight and balance information, navigational data and aircraft attributes, and wherein the portable device is a wearable computer, comprising computing elements woven into wearable accoutrements, and is configured to be operably worn by a person when on-board the aircraft and when external to the aircraft,
wherein the woven fabric further comprises an interweave of fullerenes, capacitors, integrated photovoltaics, logic devices, photo-optic lines, thermo-electrical sensors, micro-thin carbon fibers for distributing heat, luminescent threads forming soft displays, at least one of ultrathin crystal chips for converting pressure into electricity or movable gears for generating electricity from friction, and at least one active or passive motion sensor for capturing motion to be translated into commands.

30. The portable, computerized aircraft flight device of claim 29, wherein the portable, computerized aircraft flight device is a woven fabric comprising at least one of solar conducting thread, electrical conducting thread, coolant thread, optically conductive thread, sensors, fullerenes, processors, and display elements.

* * * * *